United States Patent
Williams et al.

(10) Patent No.: US 9,562,635 B2
(45) Date of Patent: Feb. 7, 2017

(54) CONDUIT FITTING WITH PULL-UP INDICATION

(71) Applicant: Swagelok Company, Solon, OH (US)

(72) Inventors: Peter C. Williams, Cleveland Heights, OH (US); Tobin Berry, Chagrin Falls, OH (US); George A. Carlson, Ravenna, OH (US); Andrew P. Marshall, University Heights, OH (US); Mark A. Clason, Orwell, OH (US); Mark A. Bennett, Bainbridge Township, OH (US); Sanjeev S. Moghe, Northfield Center, OH (US)

(73) Assignee: Swagelok Company, Solon, OH (US)

( * ) Notice: Subject to any disclaimer, the term of this patent is extended or adjusted under 35 U.S.C. 154(b) by 253 days.

(21) Appl. No.: 14/509,505

(22) Filed: Oct. 8, 2014

(65) Prior Publication Data

US 2015/0021903 A1  Jan. 22, 2015

Related U.S. Application Data

(63) Continuation of application No. 13/860,763, filed on Apr. 11, 2013, now abandoned, which is a
(Continued)

(51) Int. Cl.
*F16L 17/00* (2006.01)
*F16L 19/04* (2006.01)
(Continued)

(52) U.S. Cl.
CPC .............. *F16L 19/045* (2013.01); *F16L 15/04* (2013.01); *F16L 19/043* (2013.01); *F16L 19/06* (2013.01); *F16L 19/061* (2013.01); *F16L 19/103* (2013.01)

(58) Field of Classification Search
USPC .......................... 285/328.7, 339, 3, 348, 246, 245,285/341–343, 353
See application file for complete search history.

(56) References Cited

U.S. PATENT DOCUMENTS

| 1,143,815 A | 6/1915 | Duffy |
| 1,595,310 A | 8/1926 | Mueller |
| (Continued) | | |

FOREIGN PATENT DOCUMENTS

| CN | 1244240 | 2/2000 |
| CN | 101120197 | 2/2008 |
| (Continued) | | |

OTHER PUBLICATIONS

Search Report from European Application No. 12161444 dated Apr. 27, 2012.
(Continued)

*Primary Examiner* — Aaron Dunwoody
(74) *Attorney, Agent, or Firm* — Calfee, Halter & Griswold LLP

(57) ABSTRACT

A fitting for a tube or pipe capable of functioning a high pressures having a first fitting component adapted to receive the conduit end; a conduit gripping device such as a ferrule or ferrules and a second fitting component that can be joined to the first fitting component to cause the conduit gripping device to grip the conduit and seal when assembled. In one aspect of the invention, the first fitting component is constructed from a material that is softer than the material used to construct the second fitting component. An additional aspect of the invention include a retaining portion on the second fitting component that constrains the tube gripping device against pressure. The retaining portion can also be configured to retain the tube gripping device to the second fitting component prior to installation and in a finger-tight condition. A further aspect of the invention includes a first
(Continued)

fitting component in which an exterior portion of the component is work hardened radially outward from the tube gripping device. The fitting may optionally be provided with a structure to effect the pull-up by torque functionality.

16 Claims, 17 Drawing Sheets

Related U.S. Application Data continuation of application No. 12/718,180, filed on Mar. 5, 2010, now Pat. No. 8,439,407, which is a continuation of application No. 11/112,800, filed on Apr. 22, 2005, now Pat. No. 7,695,027.

(60) Provisional application No. 60/564,358, filed on Apr. 22, 2004, provisional application No. 60/633,885, filed on Dec. 7, 2004.

(51) Int. Cl.
| | | |
|---|---|---|
| *F16L 19/06* | (2006.01) | |
| *F16L 19/10* | (2006.01) | |
| *F16L 15/04* | (2006.01) | |

(56) References Cited

U.S. PATENT DOCUMENTS

| | | | |
|---|---|---|---|
| 2,377,891 | A | 6/1945 | Laue |
| 2,544,109 | A | 3/1951 | Richardson |
| 2,904,355 | A | 9/1959 | Creamer |
| 3,039,796 | A | 6/1961 | Lawman |
| 3,006,558 | A | 10/1961 | Jacobs |
| 3,029,796 | A | 6/1962 | Lawman |
| 3,139,293 | A | 6/1964 | Franck |
| 3,248,136 | A | 4/1966 | Brozek et al. |
| 3,441,297 | A | 4/1969 | Koski |
| 3,512,912 | A | 5/1970 | Maurer |
| 3,521,912 | A | 7/1970 | Maurer |
| 3,695,647 | A | 10/1972 | Pugliese |
| 3,773,169 | A | 11/1973 | Zahuranec et al. |
| 3,848,905 | A | 11/1974 | Hammer et al. |
| 3,972,112 | A | 8/1976 | O'Sickey et al. |
| 4,438,953 | A | 3/1984 | Timme, Jr. |
| 4,475,748 | A | 10/1984 | Ekman |
| 4,568,114 | A | 2/1986 | Konrad |
| 4,799,717 | A | 1/1989 | Kingsford |
| 4,826,218 | A | 5/1989 | Zahuranec |
| 4,881,316 | A | 11/1989 | Wing |
| 4,915,427 | A | 4/1990 | Zahuranec |
| 4,919,455 | A | 4/1990 | Yoshiro |
| 4,944,534 | A | 7/1990 | Kotyk |
| 5,074,599 | A | 12/1991 | Wirbel et al. |
| 5,186,501 | A | 2/1993 | Mano |
| 5,280,967 | A | 1/1994 | Varrin, Jr. |
| 5,516,157 | A | 5/1996 | Williamson |
| 5,536,049 | A | 7/1996 | Coules |
| 5,622,393 | A | 4/1997 | Elbich et al. |
| 5,796,898 | A | 8/1998 | Lee |
| 5,882,050 | A | 3/1999 | Williams et al. |
| 6,109,660 | A | 8/2000 | Akiyama et al. |
| 6,629,708 | B2 | 10/2003 | Williams et al. |
| 6,640,457 | B2 | 11/2003 | Williams et al. |
| 6,860,514 | B2 | 3/2005 | Wentworth et al. |
| 7,002,077 | B2 | 2/2006 | Pyron |
| 7,032,932 | B2 | 4/2006 | Guest |
| 7,066,496 | B2 | 6/2006 | Williams et al. |
| 7,108,288 | B2 | 9/2006 | Bennett et al. |
| 7,194,817 | B2 | 3/2007 | Williams |
| 7,430,811 | B2 | 10/2008 | Williams et al. |
| 7,677,602 | B2 | 3/2010 | Bennett et al. |
| 7,690,696 | B2 | 4/2010 | Mallis et al. |
| 7,695,027 | B2 | 4/2010 | Williams et al. |
| 8,876,170 | B2 * | 11/2014 | Williams ................. F16L 19/10 285/342 |
| 8,931,810 | B2 * | 1/2015 | Clason ................. F16L 19/103 285/342 |
| 9,010,810 | B2 * | 4/2015 | Anton .................... F16J 15/064 285/342 |
| 2005/0242582 | A1 | 11/2005 | Williams et al. |
| 2010/0219631 | A1 | 9/2010 | Williams et al. |
| 2011/0277309 | A1 | 11/2011 | Bearer et al. |
| 2013/0264817 | A1 | 10/2013 | Williams |
| 2014/0252758 | A1 * | 9/2014 | Bennett ................. F16L 19/065 285/93 |

FOREIGN PATENT DOCUMENTS

| | | |
|---|---|---|
| DE | 645775 | 6/1937 |
| DE | 1775542 | 7/1971 |
| DE | 2145760 | 3/1973 |
| DE | 3511056 | 10/1986 |
| DE | 4041679 | 6/1992 |
| DE | 19607784 | 10/1996 |
| DE | 19736765 | 2/1999 |
| DE | 10206684 | 8/2003 |
| DK | 112060 | 11/1968 |
| EP | 899498 | 3/1999 |
| EP | 1020675 | 7/2000 |
| EP | 1271038 | 1/2003 |
| EP | 1612467 | 1/2006 |
| GB | 384700 | 12/1932 |
| GB | 981709 | 1/1965 |
| JP | 7-243564 | 9/1995 |
| WO | 2008/057983 | 5/2008 |
| WO | 2011/099667 | 8/2011 |

OTHER PUBLICATIONS

Search Report from European Application No. 12161445 dated Apr. 27, 2012.
Office action from European Application No. 12161443.2 dated Nov. 30, 2015.
Search Report from European Application No. 12161443.2 dated May 21, 2012.
One page drawing dated Apr. 28, 2009—Standard 800 Series Space Collar Assy., (illustrated collar and fitting assembly offered for sale at least as early as Feb. 5, 2000) Swagelok Company.
Office action from Chinese Application No. 201510537977.1 dated Sep. 30, 2016.
Office action from Chinese Application No. 201510537968.2 dated Nov. 16, 2016.
Office action from European Application No. 10744371.5 dated Oct. 28, 2016.

\* cited by examiner

CONDUIT FITTING WITH PULL-UP INDICATION

RELATED APPLICATIONS

This application is a continuation application of U.S. Ser. No. 13/860,763, filed Apr. 11, 2013, titled CONDUIT FITTING WITH RADIAL CONSTRAINT, which is a continuation of U.S. application Ser. No. 12/718,180, filed Mar. 5, 2010, titled CONDUIT FITTING WITH PULL-UP INDICATION which is a continuation of U.S. application Ser. No. 11/112,800 filed on Apr. 22, 2005 for FITTING FOR TUBE AND PIPE, now issued U.S. Pat. No. 7,695,027, which claims the benefit of U.S. provisional patent application Ser. Nos. 60/564,358 for HARDENED TUBE FITTING filed Apr. 22, 2004 and 60/633,885 for FITTING FOR TUBE AND PIPE filed Dec. 7, 2004, the entire disclosures of which are fully incorporated herein by reference.

BACKGROUND OF THE INVENTION

Flareless fittings have been in use for decades for conduits such as tubes and pipes. A flareless fitting is used to connect or join two tube or pipe ends or to connect a conduit end to another assembly such as a tank, a valve, a manifold and so on. The applications are as varied as the types of assemblies with which the fittings are used. One very common type of flareless fitting is a ferrule type fitting. In a ferrule type fitting, one or more ferrules are used to join or connect a conduit end to a fitting member, typically called a fitting body. The fitting body may then be joined to (or be part of) another assembly. In a ferrule type fitting, the ferrule or ferrules must establish a fluid tight seal, particularly under pressure, as well as adequate grip of the conduit and protection against vibration fatigue. High performance fittings, such as are available from Swagelok Company, Solon, Ohio, are capable of withstanding pressures many times the rated pressure of the fitting without leaking, without vibration fatigue and without conduit blow out to the point that the conduit will burst before a seal is compromised or the ferrule(s) can lose their grip on the conduit.

Ferrule style fittings have an advantage over other end connections in that they do not rely on any special preparation of the tube or pipe end, other than low cost squaring and deburring. This is because the ferrules create the seals and tube grip.

Flareless fittings that use ferrules are commonly used in sophisticated chemical processing apparatus because of their high reliability. For example, in the semiconductor industry, such fittings assure containment of expensive or toxic chemicals. Typically, these applications are high purity and therefore, rely on conduits made of stainless steel or other low corrosion, high strength alloys.

Lower cost markets, such as the automotive industry, have their own performance requirements for fluid connections. Most notably, automotive assembly requires simpler assembly procedures. The automotive industry has resisted using ferrule type fittings not only for cost reasons, but also for assembly needs. Ferrules are fairly small annular members that can be dropped or lost in low cost, high throughput facilities. Typical ferrule type fittings are also assembled by what is commonly known as pull-up by turns. Two threaded components, such as a nut and body, enclose the conduit end and one or more ferrules. The assembly is first tightened to a finger tight condition and then a prescribed number of turns, such as one and a quarter or one and a half turns, are used to pull-up the fitting to its final assembled condition. The number of turns is carefully prescribed to prevent over torque or inadequate pull-up. The automotive industry on the other hand typically wants to assemble parts by torque. This allows a simple torque wrench or tool to be used to make the final assembly with the assurance that the fitting has been properly assembled.

The next generation of motor vehicles, especially for passenger use, will likely be in the area of alternative fuels such as high pressure hydrogen. The pressure ratings that will be required significantly exceed current rated pressure for ferrule type, flareless fittings (although not the pressure capability of high performance ferrule type, flareless fittings.) For example, it is expected that gaseous hydrogen will need to be contained at a pressure of 15,000 psi (15 ksi). Current flareless tube fittings are rated below 10 ksi.

For current high pressure flareless fittings, the material used for the fluid components of the fitting, in at least some applications, must be hardened. To this end, the block of material from which the fitting body is made may be a material hardened by heat treating or, in the example of an austenite stainless steel, may be manufactured from work hardened bar stock. For a straight union fitting, manufacturing the fitting from work hardened bar stock is suitable. More complex configurations, such as elbows and tee shapes, however, require substantially larger blocks of material. For these types of fittings, a substantial amount of material must be removed, which can drive up manufacturing costs.

Some threaded tube fittings, on the other hand are made from compact forgings which save material and cost. The use of forged fitting components is well accepted for low pressure applications. The forging process, however, can cause material annealing which eliminates any prior work hardening. Thus, forged components are typically unsuitable for high pressure applications.

SUMMARY OF THE INVENTION

In accordance with one aspect of the invention, a fitting is provided that will perform at a high pressure rating without compromising leakage, grip and vibration performance achieved by earlier two ferrule tube fittings, even while in some embodiments using lower cost manufacturing processes and materials. In one embodiment, a male fitting component, such as a nut, includes a structure, which constrains a tube gripping device, such as a ferrule or ferrules. As a result, the mating female fitting component need not be formed from a hardened material. The invention thus provides, in accordance with additional aspects, a high pressure fitting that utilizes a fitting body of one material, with a mating nut that is made of a harder material. For example, the body may be annealed stainless steel and the nut may be work hardened stainless steel. This combination can be used in higher pressure applications that can have rated pressures greater than 8 ksi, even greater than 12 ksi. This in part arises from the use of a nut that has a hardness ratio relative to the body of about 1.3:1 to about 2:1 (Vickers scale) or greater. In another embodiment, the ferrules are case hardened, for example by a low temperature carburization process to provide very hard ferrules. In another embodiment, the nut provides a secondary pressure seal against a surface of the fitting body.

In accordance with another aspect of the invention, a fitting is provided with a first component that has a portion adapted to constrain a tube gripping device where the exterior of the component is work hardened, for example, in the area of radial constraint. In one embodiment, a selected portion of the fitting is work hardened, for example the female fitting component, by plastically deforming the material on an exterior portion or surface of the female fitting component. Because the selected portion is work hardened, the female fitting component can be initially made from a non-hardened material by forging or casting. In another embodiment, the work hardening provides a more useful configuration to the fitting. For example, the work hardening can include an external thread convolution that allows the fitting to connect with another device or structure. The invention also relates to a method of selectively work hardening, such as by rolling circumferential ridges or threads, for example, on a female threaded fitting component, that may be made initially as a forging.

In accordance with another aspect of the invention, a ferrule type, flareless fitting is provided that can optionally be pulled-up to its final assembled condition by torque rather than by turns. In one embodiment, a male fitting component, such as a nut, includes a structure having a surface that engages a surface on a female fitting component to facilitate pull-up by torque. In another embodiment, a ferrule is provided with a flange that engages a surface on a female fitting component to facilitate pull-up by torque. In yet another embodiment, the nut includes an external surface, for example a surface of a tool engaging portion, that engages an exterior surface on a fitting body.

In accordance with another aspect of the invention, a ferrule type flareless fitting is provided that allows for easy installation by providing a single assembly that has one or more ferrules held with a fitting component. In one embodiment, a cartridge nut assembly allows one or more ferrules to be retained securely on a fitting component prior to installation so that the ferrules and the fitting component will not become separated prior to installation. In another embodiment of the invention, a tool is provided which retains the one or more ferrules onto a fitting component prior to installation and is removably during assembly.

The invention also provides a fitting with an annealed female body and a male hardened nut in combination with the pull-up by torque functionality. The invention also provides a fitting with pull-up to torque functionality in combination with the functionality of a nut that retains one or more ferrules in an uninstalled condition. The invention also provides a fitting with pull-up to torque functionality in combination with the functionality of the nut forming a seal against the body. The invention also provides a fitting with a female threaded body having at least two tapered or camming surfaces.

In accordance with another aspect of the invention, a ferrule type flareless fitting is provided that includes a male nut that is flush with the body or recessed in the body when the fitting is in a pulled-up condition. In one embodiment, a keyed male nut, and corresponding key tool, is provided that has a hex area removed to reduce its overall length.

BRIEF DESCRIPTION OF THE DRAWINGS

The foregoing features of the present invention will become apparent to one skilled in the art to which the present invention relates upon consideration of the following description of the invention with reference to the accompanying drawings, in which.

DETAILED DESCRIPTION OF THE INVENTION

Figure 1:
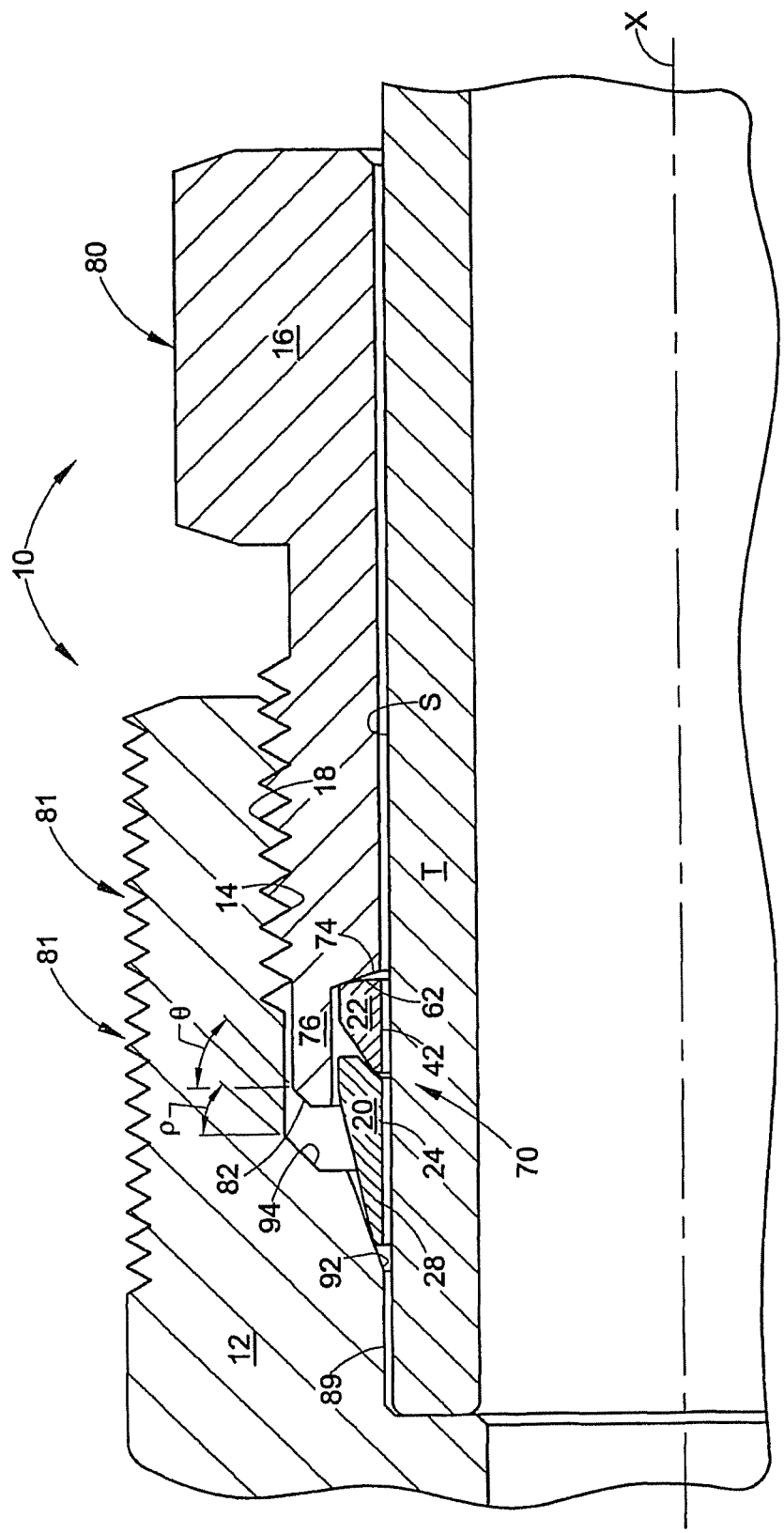
FIG. 1 is a longitudinal cross-section of an exemplary embodiment of a fitting in accordance with the present invention.

While the invention is described herein with specific reference to a variety of structural and material features, such descriptions are intended to be exemplary in nature and should not be construed in a limiting sense. For example, the exemplary embodiments are described primarily in terms of a stainless steel tube fitting for automotive applications. Those skilled in the art, however, will readily appreciate that any one or more of the aspects and features of the invention may be used outside of the automotive industry, can be used with materials other than stainless steel and can be used with many conduits including, but not limited to, tube or pipe. Moreover, many of the aspects of the invention may be used for lower pressure fittings, or the higher rated pressure concepts disclosed herein may be used in a fitting even when the fitting itself will be used in a lower pressure application. Still further, the exemplary embodiments herein illustrate what is commonly known as a female-style fitting, meaning that a female (i.e. internally) threaded component receives and abuts the conduit end. Many aspects of the invention will find application in male-style fittings as will be apparent to those skilled in the art. The invention will also find application for fitting assemblies that do not require threaded connections between the fitting components, for example clamped or bolted fittings may be used. The invention will also find application far beyond the exemplary embodiments herein as to connections that can be made to a wide and ever expansive variety of fluid components including, but not limited to, other conduits, flow control devices, containers, manifolds and so on.

While various aspects of the invention are described and illustrated herein as embodied in combination in the exemplary embodiments, these various aspects may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, software, hardware, control logic and so on may be described herein, such descriptions are not intended to be a complete or exhaustive list of available alternative embodiments, whether presently known or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are intended to be critical values or ranges only if so expressly stated.

Although various embodiments are described herein with specific reference to the fitting components being made of stainless steel, such description is intended to be exemplary in nature and should not be construed in a limiting sense. Those skilled in the art will readily appreciate that the invention may be realized using any number of different types of metals material for the fitting components, as well as metal tubing materials, including but not limited to 316, 316L, 304, 304L, any austenitic or ferritic stainless steel, any duplex stainless steel, any nickel alloy such as HASTALLOY, INCONEL, MONEL, alloy 825, alloy 625, any precipitation hardened stainless steel such as 17-4PH for example, brass, copper alloys, any carbon or low allow steel such as 12L14 steel for example. An important aspect of the choice of materials is that the tube gripping device preferably should be case or through hardened to a ratio of at least 3.3 and preferably 4 or more times harder that the hardest tubing material that the fitting will be used with. Therefore, the tube gripping device need not be made of the same material as the tubing itself. For example, the tube gripping device may be selected from the stainless steel material noted above, or other suitable materials that can be case hardened, such as magnesium, titanium and aluminum, to name some additional examples.

With reference to FIG. 1, the fitting 10 includes a first fitting component 12 that can be realized in the form of a female threaded body having internal threads 14. The first fitting component 12 joins or connects with a second fitting component 16 that can be realized in the form of a male threaded nut having external threads 18 that threadably mate with the threads 14 of the first component 12 when the fitting 10 is made-up or assembled. Different thread options and non-threaded coupling designs may be used for the first and second fitting components.

Figure 1A:
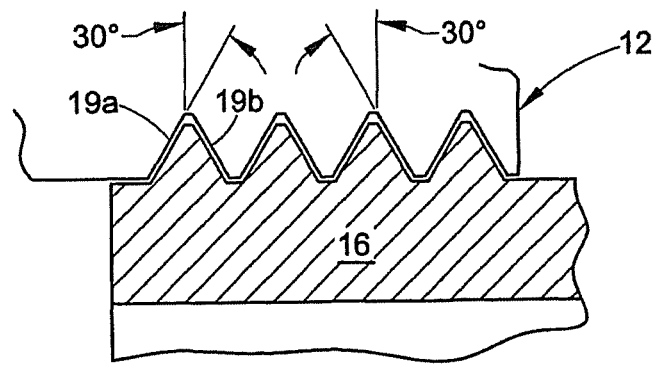
FIGS. 1A, B, and C illustrate different thread options for the fitting components of the exemplary fitting shown in FIG. 1.
Figure 1B:
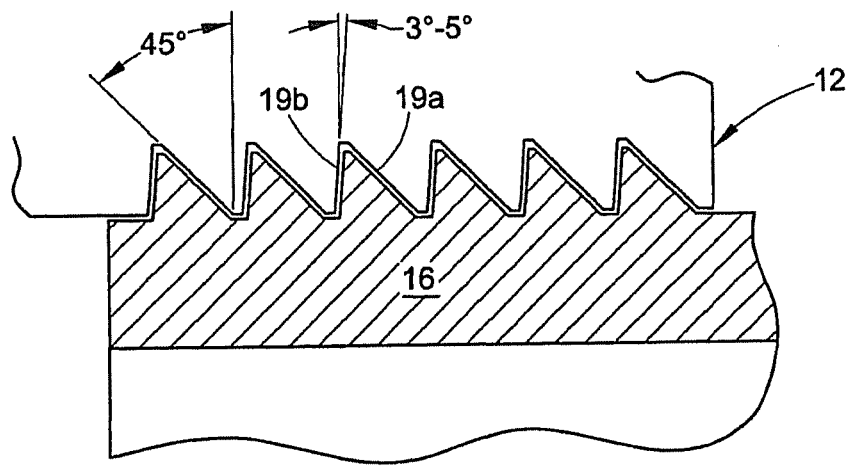
Figure 1C:
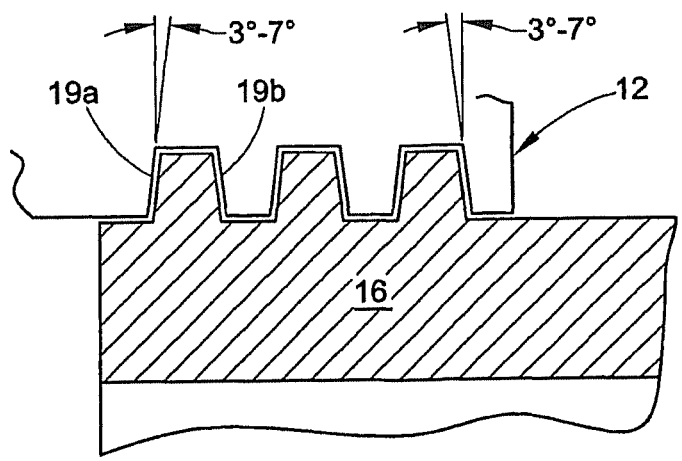

FIGS. 1A, B and C illustrate different thread options for a threaded coupling between the body 12 and nut 16. FIG. 1A illustrates 30° from normal (i.e. 60 degrees included angle) symmetrical thread flanks 19*a* and 19*b*. FIG. 1B illustrates the optional use of a buttress thread design in which the thread flanks are asymmetrical with one flank 19*a* typically in the range of about 45 degrees and the adjacent flank in the range of about 3 degrees to about 7 degrees from normal. The buttress thread design provides high strength loading on one side to help reduce flaring of the nut during high torque assembly and in high pressure applications. FIG. 1C illustrates the use of acme threads wherein the flanks again are symmetrical but of a steeper angle such as about 3 degrees to about 7 degrees from normal. The acme thread design provides higher strength loading uniformly compared to the 60 degrees threads.

The fitting 10 further includes a tube gripping device. Ferrules are an example of a tube gripping device and, in this example, two ferrules are included; a front or first ferrule 20 and a back or second ferrule 22. The fitting, however, can be designed for using a single ferrule or alternative tube gripping device. The nut 16 and ferrules 20, 22 fit onto a conduit end T that is received by the body 12.

Figure 2:
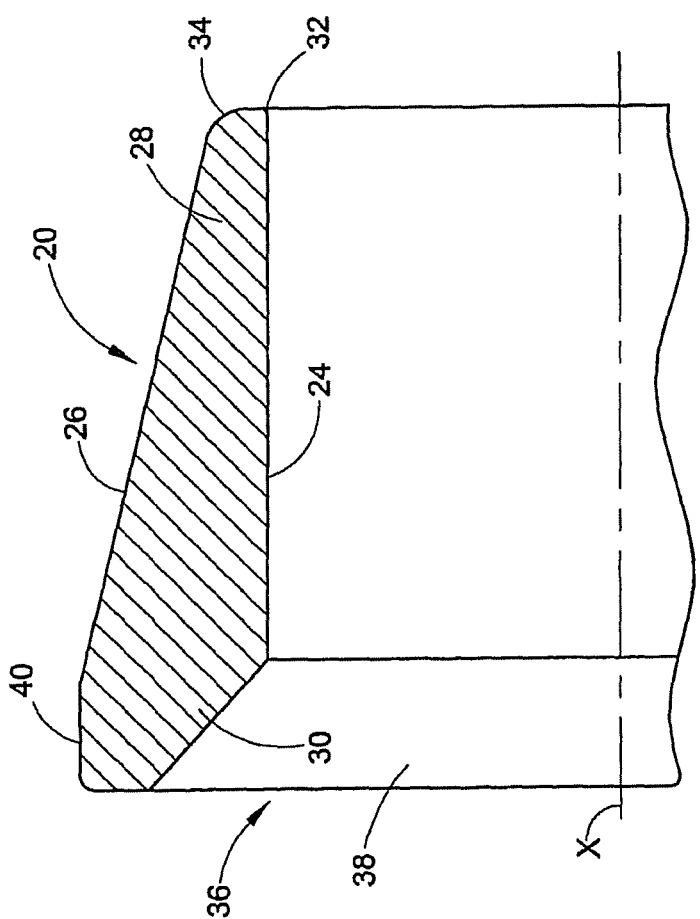
FIG. 2 is an enlarged cross section of a first ferrule of the exemplary fitting shown in FIG. 1.

FIG. 2 is an enlarged cross section of a first or front ferrule of the exemplary fitting shown in FIG. 1. The first ferrule 20 is a generally annular part with a generally cylindrical interior wall 24 that slips over the outer surface S of the tube end T (see FIG. 1). The first ferrule 20 has an outer surface 26 that tapers outwardly in a generally conical manner from a forward portion 28 to a rearward portion 30. The forward portion 28 may include a sharp front edge 32 and a rounded nose portion 34. The rearward portion 30 includes a frusto-conical recess 36 that forms a camming surface 38. The tapered outer surface 26 may converge to an axially aligned flange 40 (wherein the axis X is the central longitudinal axis of the conduit and the fitting 10).

Figure 3:
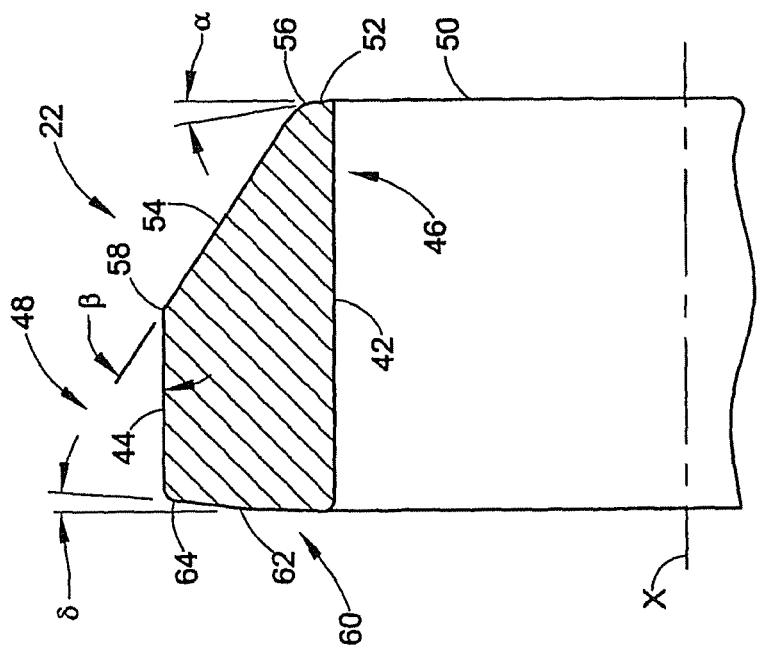
FIG. 3 is an enlarged cross section of a second ferrule of the exemplary fitting shown in FIG. 1.

FIG. 3 is an enlarged cross section of a second or back ferrule of the exemplary fitting shown in FIG. 1. The second ferrule 22 is a generally annular part with a generally cylindrical interior wall 42 that slips over the outer surface S of the tube end T (see FIG. 1). The second ferrule 22 further includes a nose portion 46 and an axially extending outer surface 44 that extends about a rearward portion 48 of the ferrule. The nose portion 46 includes a sharp front edge 50 and a first tapered portion 52 that extends toward the rear portion 48 from the sharp edge 50 at a rake angle α of about fifteen degrees, for example. The first tapered portion 52 merges or blends to a second tapered portion 54 along a first curved portion 56 such as a radius, for example. The second tapered portion 54 merges or blends to the axial portion 44 at a corner or edge 58 which may alternatively be a radius. The second tapered portion 54 extends at an angle β, such as about thirty-five degrees, for example.

The second ferrule 22 further includes a back end portion 60 that has a driven surface 62. The driven surface 62 extends radially outwardly at an angle δ, such as about five degrees (referenced from normal to the axis X), for example. The driven surface 62 merges or blends with the axial portion 44 along a second curved portion 64.

Figure 4:
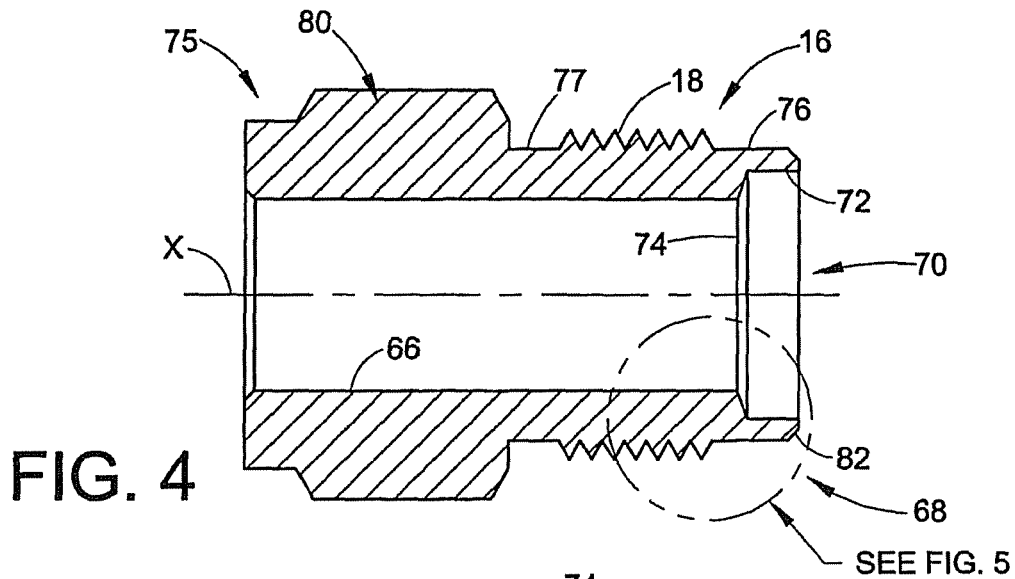
FIG. 4 is a cross section of a nut of the exemplary fitting shown in FIG. 1.
Figure 5:
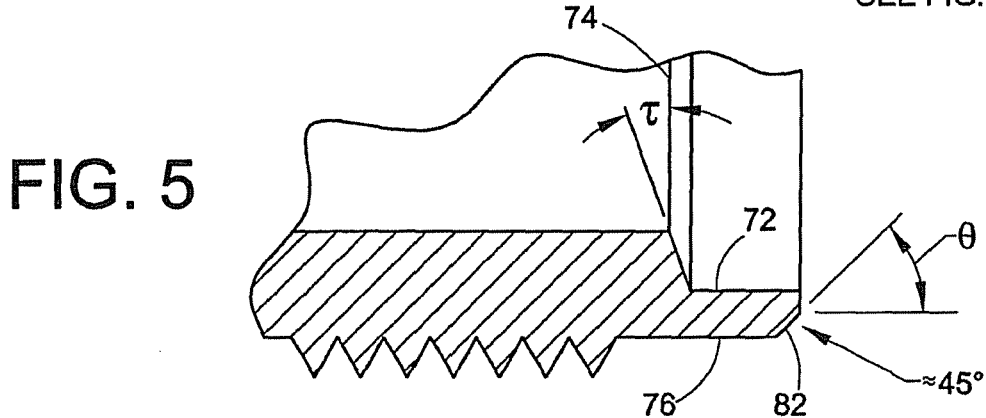
FIG. 5 is a cross section of the nut of FIG. 5, enlarged in the area of the cartridge.

FIGS. 4-5 illustrate a cross section of a nut of the exemplary fitting shown in FIG. 1. The nut 16 has an overall cylindrical configuration defining a central bore 66 that receives the tube end T during assembly. The nut 16 has a front end 68 that defines a socket, recess or cage 70. The socket 70 is defined by a cylindrical first portion 72 and a frusto-conical portion 74 that tapers radially inwardly towards a back end 75 of the nut 16. The frusto-conical portion 74 forms a drive surface that contacts the driven surface 62 of the second or back ferrule during pull-up. The drive surface 74 is formed at an angle τ, such as about fifteen degrees, for example. Because the angle τ is different from the angle δ, the driven surface 62 of the back ferrule 22 initially contacts the drive surface 74 at the outer radius 64 (see FIG. 7). The difference angle Φ, where Φ=τ−δ, assures that the initial contact between the nut 16 and the second ferrule 22 is radially spaced from the tube end T; thus, the contact between the driven and the drive surfaces 62, 74 is not a flush.

The socket 70 is formed within an axially extending and generally cylindrical wall or cartridge 76. The cartridge 76 is sized to retain the back ferrule 22 and at least a portion of the rearward portion 30 of the front ferrule 20 therein, to form a nut and ferrule assembly or cartridge nut assembly 78 (see FIG. 10). The term cartridge as used herein is a shorthand reference to the concept of a fitting component, in this example a male threaded nut 16 having a structure that can retain one or more ferrules therewith even when the assembly is uninstalled with the mating fitting component. Thus, the cartridge nut assembly 78, which includes the cartridge nut 16 and one or more ferrules 20, 22, may be used to retain the ferrules and nut together when the assembly is either uninstalled or only installed in the body 12 in a finger tight condition.

Many different techniques may be used to retain the ferrule or ferrules 20, 22 within the cartridge nut 16 prior to final pull-up or even initial assembly into the mating fitting component. For example, a non-contaminating glue or adhesive may be used to hold the ferrules 20, 22 in place, with the glue releasing its grip under the force of pull-up. Alternatively, the cartridge wall 76 may be slightly crimped radially inwardly to retain the ferrules 20, 22 therein. Still further, an adhesive may be used that breaks down into a lubricant upon pull-up to help reduce pull-up torque. In another embodiment disclosed herein, a tool is used to hold the parts together as an assembly 78 (see FIG. 10).

With reference to FIG. 5, the cartridge 76 may include a tapered portion 82 that tapers radially outwardly towards the back end 75 of the nut 16. The tapered portion 82 extends at an angle θ, such as for example about forty-five degrees.

The nut 16 further includes a tool engagement portion 80 that allows a torque wrench or other tool to be used to tighten and pull-up the fitting 10. The tool engagement portion 80 in the exemplary embodiment of FIG. 1 is realized as a hex portion 80. The tool engagement portion 80 can be found in variety of ways. For example, the nut 16 may include a key hole that allows a corresponding keyed wrench to be used to tighten and pull-up the fitting, as described in relation to FIGS. 21-22.

The nut 16 may further include a neck 77 of somewhat reduced outer diameter between the threads 18 and the tool engagement portion 80. The neck 77 may be used to provide an intrinsic gauging function to verify proper pull-up for both pull-up by torque and pull-up by turns. By intrinsic gauging is meant a structure or feature associated with the fitting itself (as contrasted with a separate tool or gauge) that provides an indication to the assembler that the fitting has been properly assembled and pulled up. A large variety of structures or features can perform the intrinsic gauging function, some examples of which are disclosed in International Application No. 03/07739 and U.S. patent application Ser. No. 10/711,353, and U.S. Pat. No. 6,640,457 B2, the entire disclosures of which are fully incorporated herein by reference. A gap gauge may also be used in a known manner to confirm proper pull-up of the fitting 10.

Figure 6:
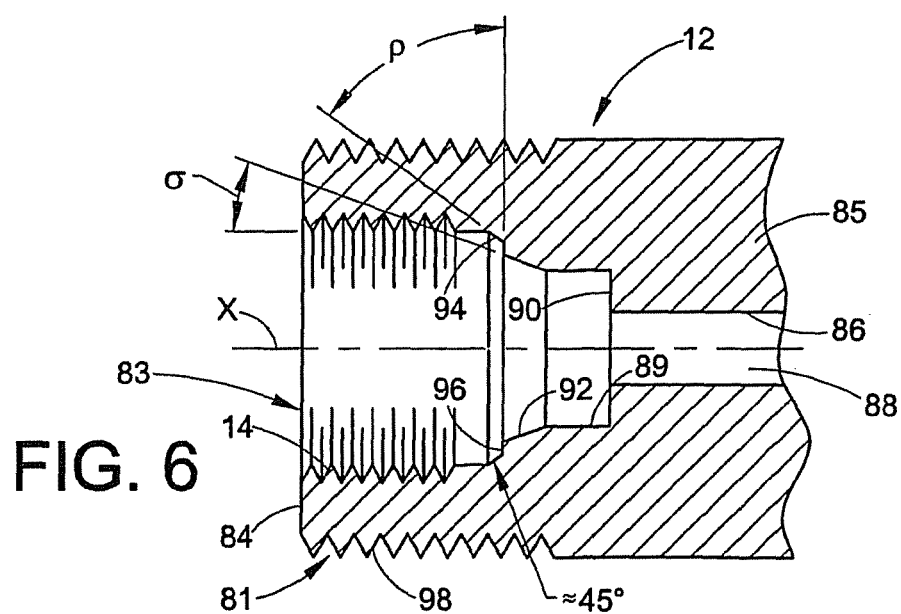
FIG. 6 is a cross section of a body of the exemplary fitting shown in FIG. 1.

With reference to FIG. 6, the female threaded body 12 is a generally cylindrical part centered on the axis X. The body 12 has an opening 83 at a forward end 84 adapted to receive the tube end T. A central bore 86 extends through the body 12 and forms a port 88 which defines a fluid flow path. The port 88 may be used to establish fluid communication with another part such as a valve, tee, elbow, manifold, etc. It should be noted that although the female threaded fitting component 12 is shown as a separate stand alone part, the features of the component by which it can make a fluid connection with the male threaded fitting component could, alternatively, be incorporated into a bulk body 85 such as a manifold, valve, pump, tank, and so on, commonly referred to as a fluid port.

The female body further includes a counterbore 89 that forms a shoulder 90. The tube end T bottoms against the shoulder 90 when received by the body 12. The counterbore 89 may have a slight taper to it to help form a seal about the tube end T upon pull-up of the fitting 10.

The female fitting component 12 further includes a first tapered surface, such as for example frusto-conical surface 92 and a second tapered surface, such as for example frusto-conical surface 94. The first frusto-conical surface 92 forms a first or ferrule camming surface in the body 12 and may be axially adjacent the forward end of the counterbore 89. The second frusto-conical surface 94 forms a second or cartridge camming surface in the body 12 and may be axially adjacent or near the forward end of the first camming surface 92. The first or ferrule camming surface is formed at an angle σ. The angle σ may be selected to optimize the camming action with the nose portion 34 of the first ferrule 20. In typical two ferrule and one ferrule fittings, this angle is about twenty degrees but may be any suitable value from about 10 degrees to about forty-five degrees.

The second or cartridge camming surface 94 is formed at an angle ρ. In this example, the angle is about forty-five degrees, but this angle is not required. The angles σ and ρ may be the same or different from each other. In the illustrations herein, the angles are different, therefore there is a radial step 96 that joins the two camming surfaces 92, 94. This step may be radial or may have its own angle or taper or other profile as needed.

The body 12 further includes female threads 14 which threadably mate with the threads 18 on the male nut 16. It should be noted that the body 84 may also be formed into a cap by closing off or eliminating the port 86, such as for example can be used to cap the end of a fluid line. The body 12 may be provided with hex flats to facilitate holding the body while the nut 16 is being tightened down during pull-up. Of course, pull-up involves relative axial translation between the fitting components, the nut 16 and body 12, in this case effected by relative rotation between the nut and body, regardless of which fitting component is being held and which is being turned. In a non-threaded coupling, pull-up involves relative axial translation between the two fitting components by means other than two threaded components, such as for example two components forced together by a clamping device.

The body 12 may also include a work hardened portion 81 formed generally radially outward of the ferrules 20, 22. In addition to being radially outward of the tube gripping device 20, 22, the amount and location of work-hardening can be selected, as appropriate, for a given application. The work hardened portion preferably extends from the forward end 84 of the fitting body 12 to at least a location radially outward of the radial step 96. The work hardening portion, however, may extend, for example, to a location radially outward of the rearward end of the first camming surface 92 or extend the entire length of the exterior surface of the body 12. The work hardening is accomplished by plastically deforming the material on an exterior portion of the fitting component 12. The material can be plastically deformed in a variety of ways. For example, the work hardening may be accomplished by creating a series of generally rolled circumferential ribs or by rolling an exterior male thread 98 on the fitting body 12.

Figure 7:
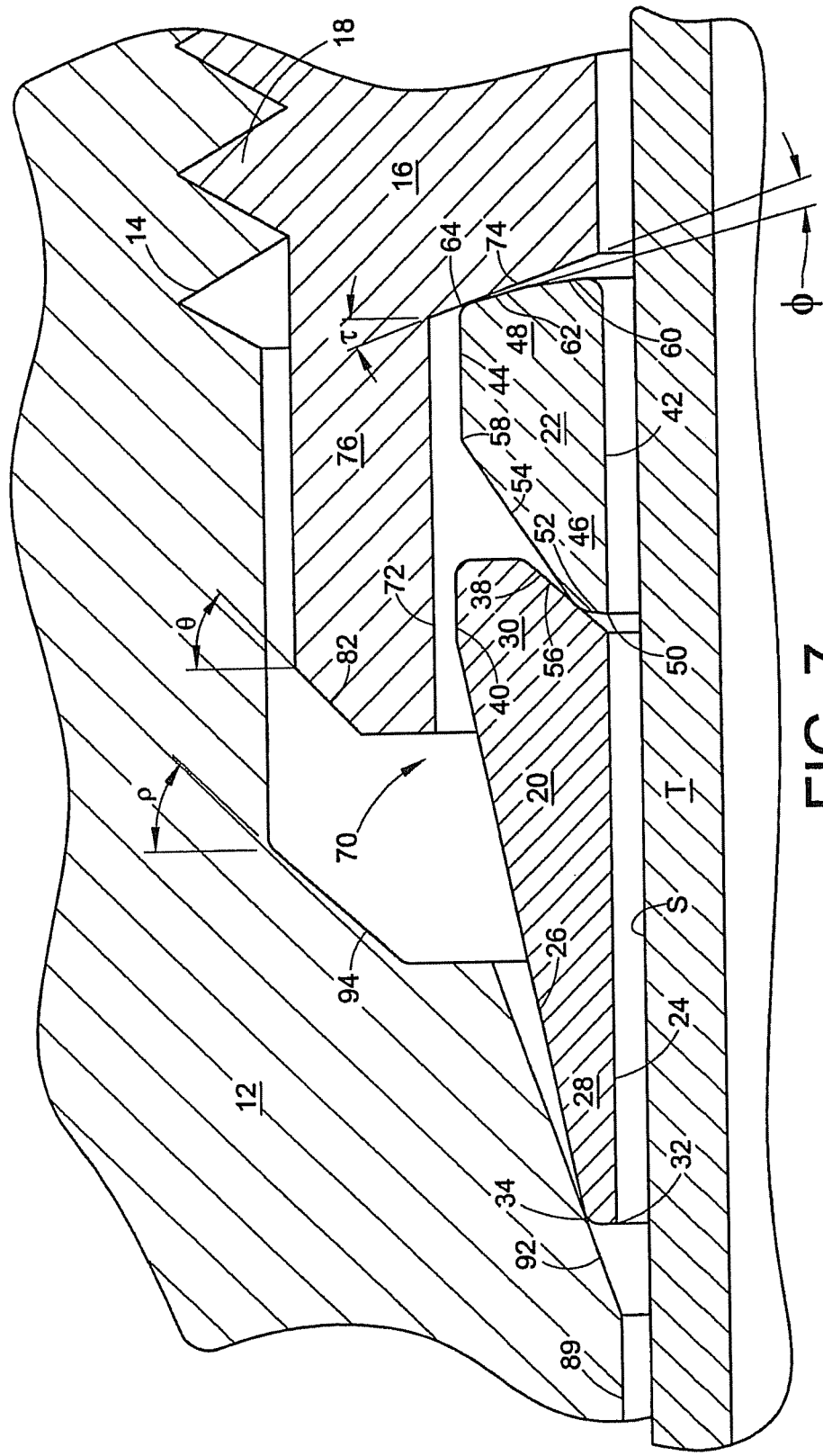
FIG. 7 is a half longitudinal cross-section of the exemplary fitting shown in FIG. 1 in a finger tight condition, enlarged in the area of the ferrule.
Figure 8:
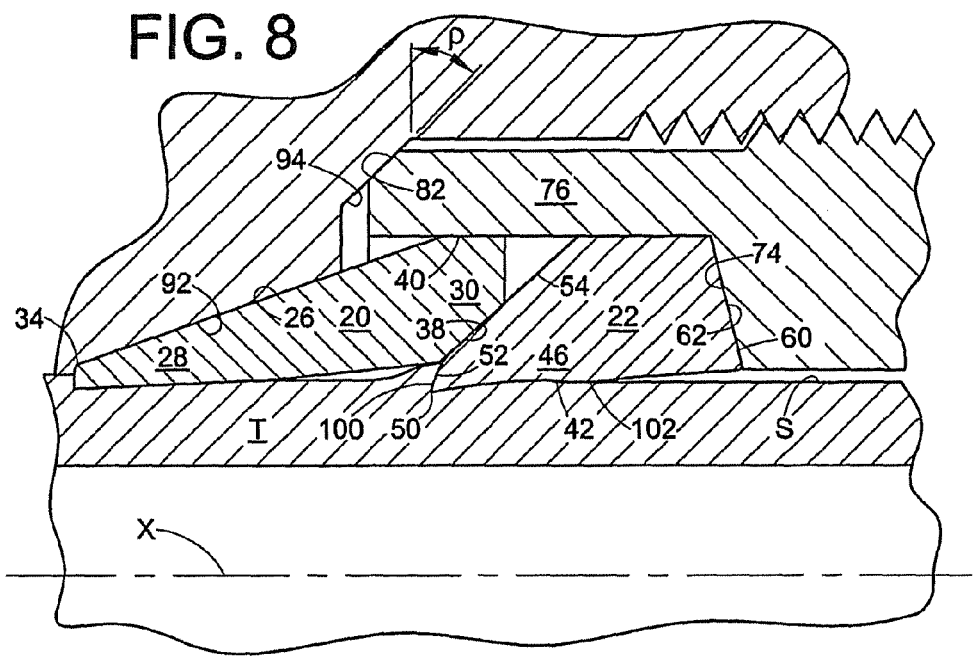
FIG. 8 is a half longitudinal cross-section of the exemplary fitting shown in FIG. 1 in a pulled-up condition, enlarged in the area of the ferrule.

FIGS. 7 and 8 illustrate the fitting 10, enlarged in the area of the ferrules, in a finger tight condition and a pulled-up condition, respectively. In the finger tight condition of FIG. 7, the first or front ferrule nose portion 28 is positioned partially within the camming mouth formed by the ferrule camming surface 92. Note that the back ferrule 22 engages the drive surface 74 of the nut 16 at the difference angle Φ. This assures that during pull-up the back end portion 60 of the second ferrule 22 will move or remain radially outward from the outer surface S of the tube end T. At the same time, the nose portion 46 of the back ferrule 22 is plastically deformed so that the sharp edge 50 bites or indents into the tube surface S, producing a strong tube gripping shoulder 100 and a fluid tight seal. The ferrule nose 46 also hinges so that a portion 102 of the cylindrical wall 42 is radially compressed against the tube wall surface S to swage or collet the back ferrule 22 against the surface axially spaced from the bite 100. This region of high radial compression and collecting of the back ferrule 22 provides excellent protection of the bite or indent 100 from vibration. The back ferrule 22 thus is designed to hinge in deformation and effect upon pull-up the collecting region 102 between the bite or indent 100 and the back end 60 of the ferrule while having the back end portion 60 moved radially outward or kept radially outward from the outer surface S of the tube end T. The exact location of the collecting region 102 will be determined by, among other things, the size of the ferrule 22. In some cases, the collet region 102 can be adjacent the bite or indent 100 while in other cases the collecting region may occur axially spaced from the bite or indent. The collet region 102 may in some case be further characterized by a convex profile that swages the tube end.

The relative axial translation between the two fitting components 12, 16 is performed so that the forward tapered surface 82 of the cartridge 76 contacts and cams against the second tapered surface 94 of the body 12. The contact between the cartridge 76 and the v surface 94 produces a coining like action so that the cartridge tapered surface 82 forms a strong fluid tight seal against the camming surface 94. At the same time, the front ferrule surface, especially at the radius 34, forms a seal against the first camming surface 92. The front ferrule 20 may optionally swage or bite into the tube wall S to provide tube grip.

The primary functions of the ferrules 20, 22 are to create fluid tight seals and tube grip, along with resistance to fatigue from outboard system induced vibration. The front ferrule 20 is used primarily to provide a fluid tight seal against the body 12 and the tube outer surface S, while the back ferrule 22 is used for a back-up seal against the tube outer surface S and to provide excellent tube grip. The particular geometry and operation of the ferrules, or a single ferrule in such applications, can be selected as required for a particular application and dependent on the types of materials being used. The back ferrule 22, for example, may be provided with one or more recesses in the interior cylindrical wall 42 of the ferrule, and the driven surface 62 of the ferrule may be contoured. Still further, one or both of the ferrules 20, 22 may be case hardened, for example by a low temperature carburization process to provide very hard ferrules that are corrosion resistant. The case hardening may be applied over a portion or all of the ferrule surface. A number of issued patents disclose such case hardening and geometry concepts that may be applied to the ferrules, such as U.S. Pat. Nos. 6,629,708; 6,547,888; 6,165,597; and 6,093,303 issued to the assignee of the present invention, the entire disclosures of which are fully incorporated herein by reference, as well as PCT International Publication Nos. WO 02/063195A2 and WO 02/063194A3 also incorporated herein by reference. Such patents and the concepts therein, however, are exemplary in nature as to the present invention and should not be construed in a limiting sense. Many different case hardening processes and a wide variety of geometric configurations may be used to properly control the plastic deformation of the ferrules during pull-up to assure adequate seal and tube grip.

Under elevated pressures, for example 15 ksi, the tube wall will tend to be radially expanded, pushing outward on the ferrules 20, 22. The cartridge 76 serves to radially contain the ferrules 20, 22 and prevent loss of seal and tube grip. Note that the body 12 does not constrain much if any of the front ferrule 20. The stress of containing the front ferrule 20 radially under pressure is achieved by the cartridge 76, as is the case with the back ferrule 22. This is significant for reasons that will be discussed hereinbelow. Note further, particularly in FIG. 1, that the optional work hardened exterior 81 will also function to contain higher pressure by radially constraining and supporting the cartridge 76 in an assembled condition.

Figure 9:
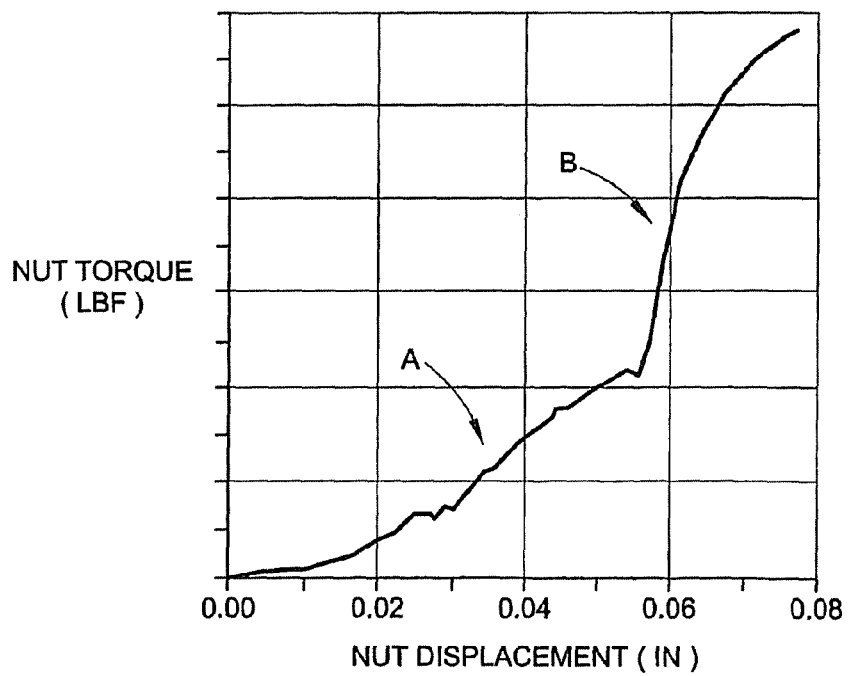
FIG. 9 is a graph of illustrative data for torque versus nut displacement for the exemplary fitting shown in FIG. 1.

Upon pull-up, when the cartridge 76 engages the second camming surface 94 in the body 12, not only will the cartridge form a seal against fluid pressure, but the assembler will also notice a sharp and dramatic increase in pull-up torque. FIG. 9 is a graph of illustrative data for torque versus nut 16 displacement. Note that in region A the torque rises somewhat slowly and steadily as a result of the ferrules 20, 22 plastically deforming while biting into the tube T and camming against the body camming surface 92 and the front ferrule camming surface 38. As soon as the cartridge 76 contacts the second camming surface 94 in the body 12, however, the torque in region B increases sharply and dramatically. By selecting an appropriate torque value that corresponds to proper pull-up, the fitting 10 can be pulled-up by torque rather than by turns. Thus, a simple torque wrench can be used to make-up the fitting 10. Note from FIG. 9 that the cartridge concept provides a very tight or steep torque to nut displacement ratio. This is in significant contrast to prior fittings wherein the torque gradually increases as the ferrules deform. Since too many factors can influence the gradual torque readings, torque cannot always be used to accurately gauge proper pull-up of prior fittings. Instead prior fittings typically are pulled-up by counting turns or displacement of the nut relative to the body. For example, region A in FIG. 9 shows that torque can increase rather little over significant displacement of the nut relative to the body, thus preventing torque from correlating well with turns or displacement.

Angling the camming surface 94, such as at the angle ρ, allows the fitting 10 to be re-made. Each remake of the fitting 10 progresses the cartridge subassembly further into the body for each re-make, even if only slightly. For very sharp torque increases, the angle ρ may approach ninety degrees (relative to the axis X). This alternative arrangement would provide a dramatic increase in torque for pull-up by torque, but in some cases may lessen the ability to remake the fitting 10 after the initial pull-up.

Figure 14:
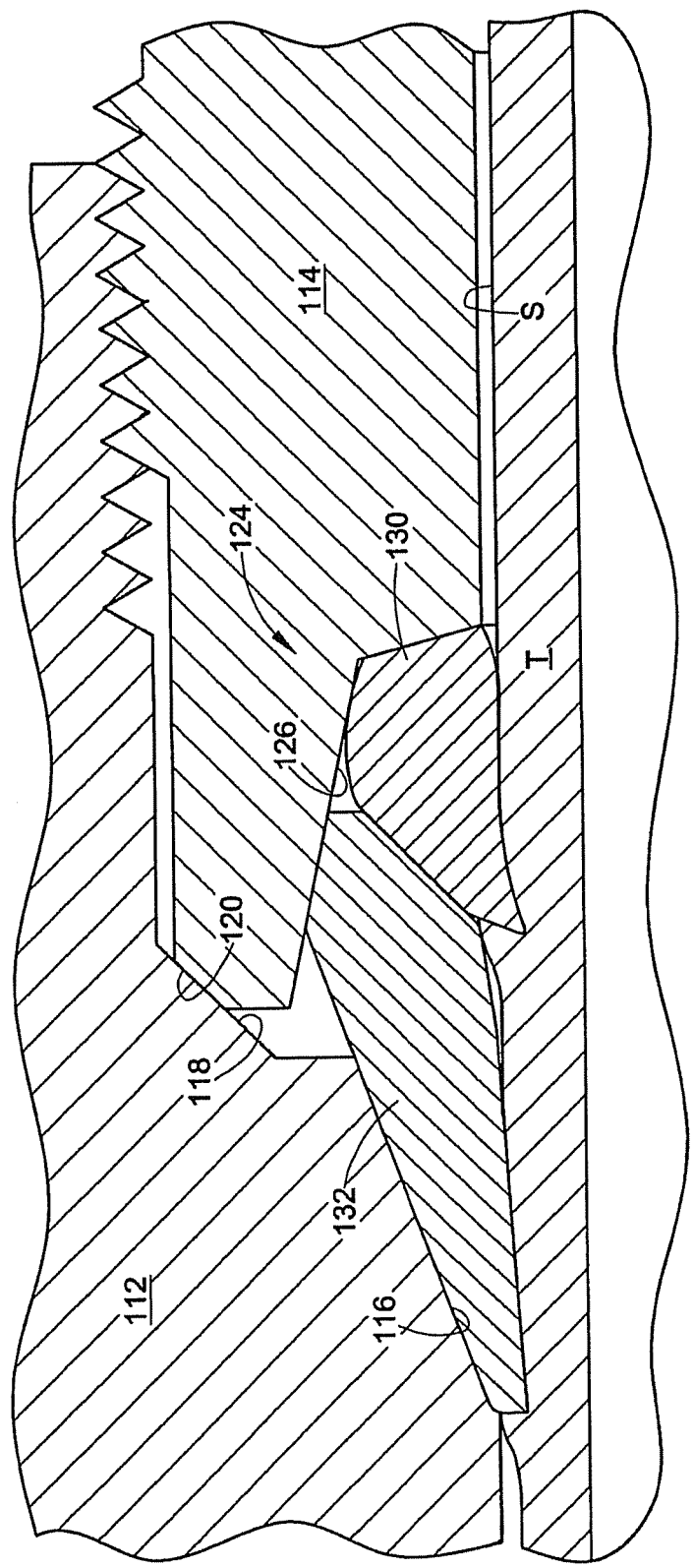
FIG. 14 is a half longitudinal cross-section of the exemplary fitting shown in FIG. 13 in a pulled-up condition, enlarged in the area of the ferrule.
Figure 15:
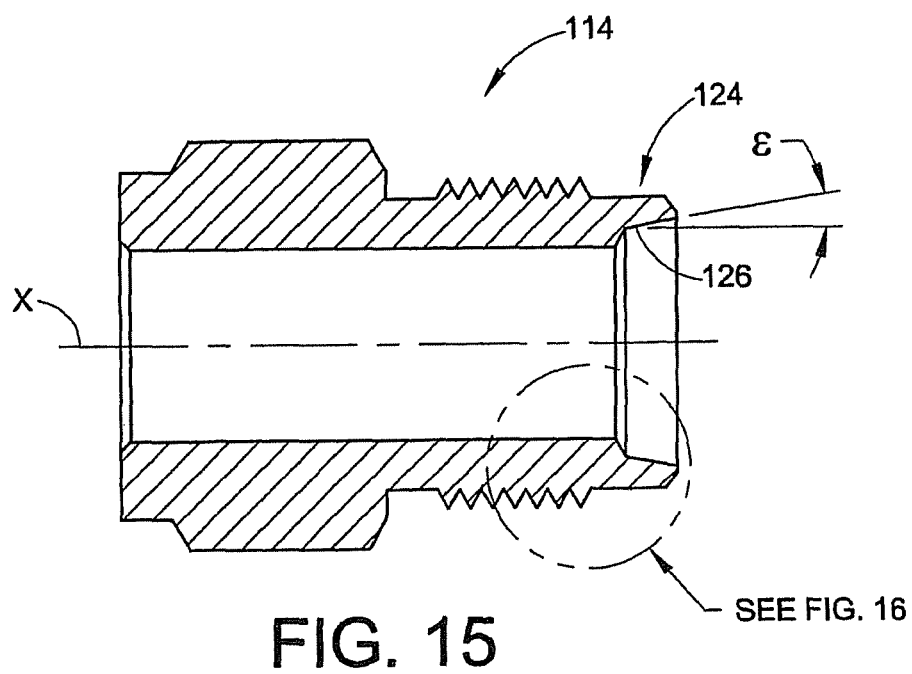
FIG. 15 is a cross section of a nut of the exemplary fitting shown in FIG. 13.
Figure 16:
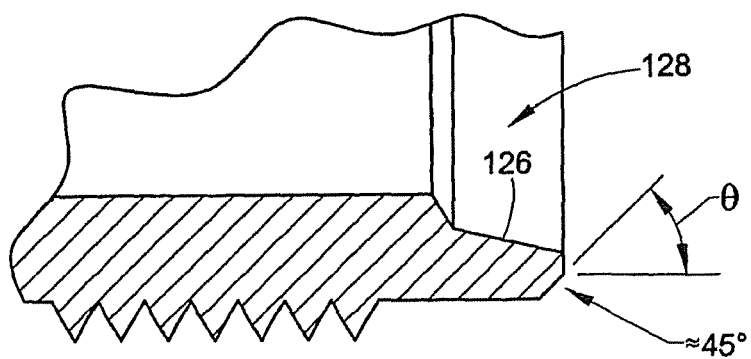
FIG. 16 is a cross section of the nut of FIG. 15, enlarged in the area of the cartridge.
Figure 18:
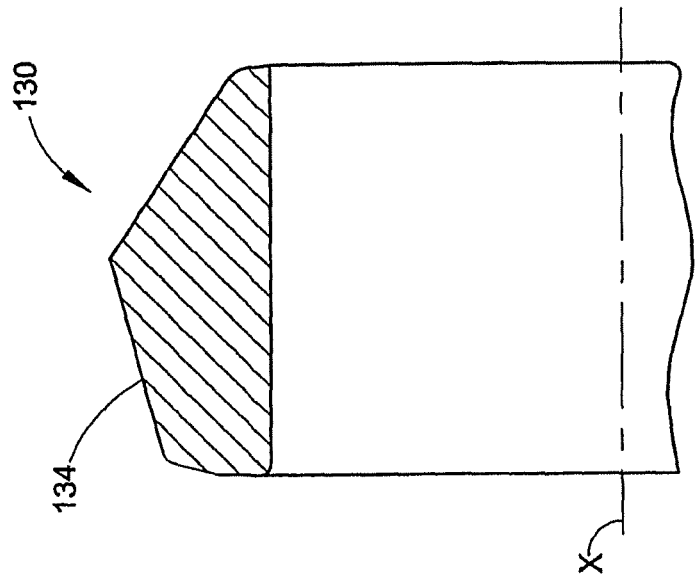
FIG. 18 is an enlarged cross section of a second ferrule of the exemplary fitting shown in FIG. 13.
Figure 17:
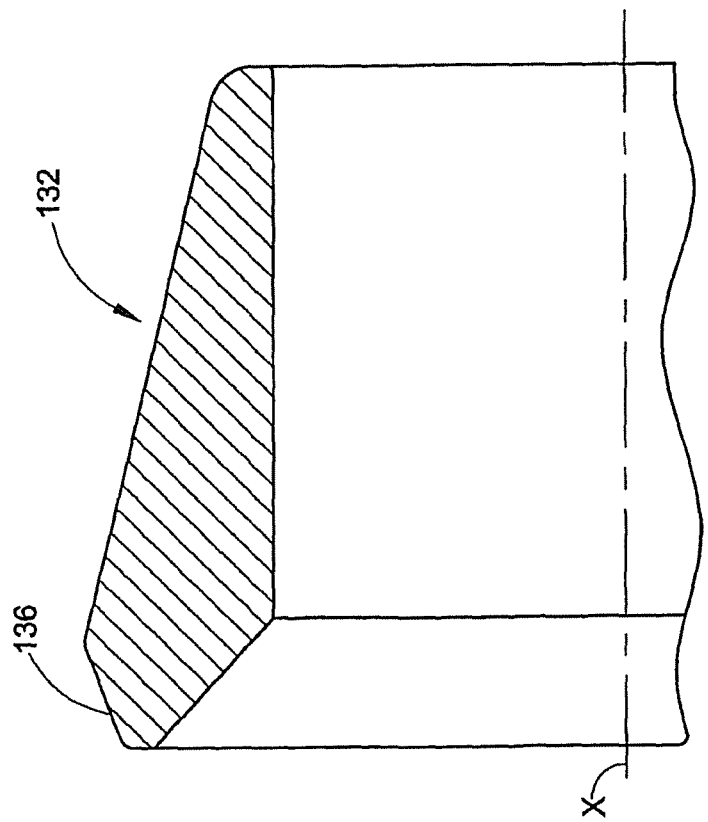
FIG. 17 is an enlarged cross section of a first ferrule of the exemplary fitting shown in FIG. 13.
Figure 21:
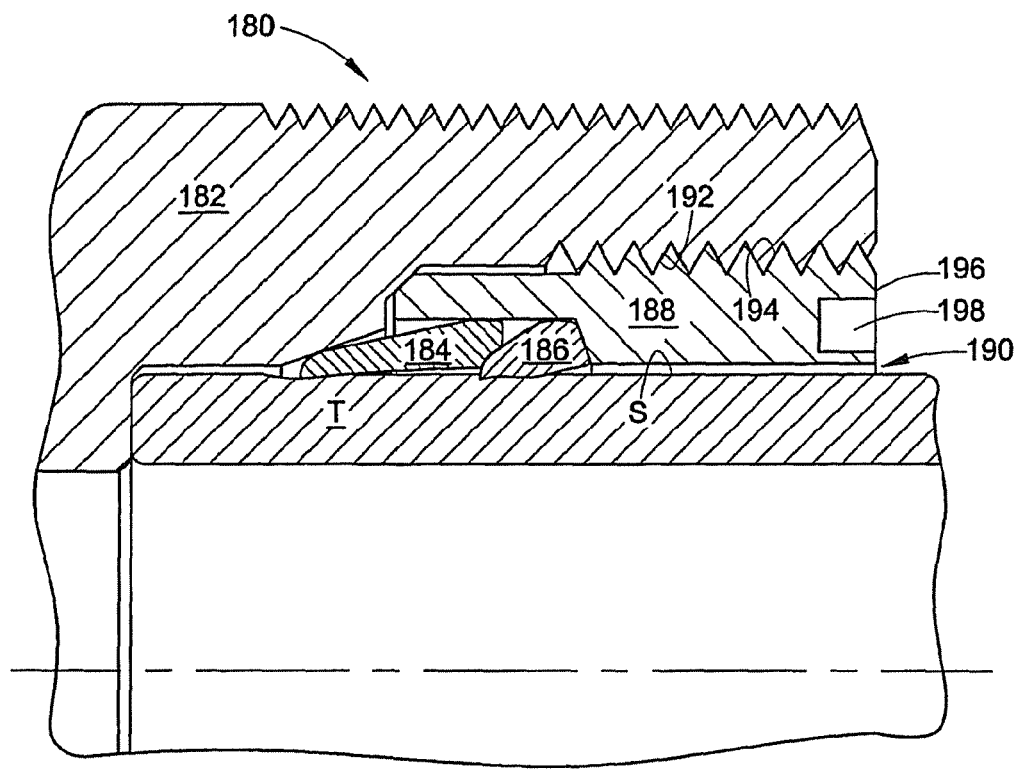
FIG. 21 is a half longitudinal cross-section of another exemplary fitting of the present invention shown in the finger tight condition.

Referring to FIG. 8, as well as the alternative embodiment of FIGS. 14 and 21 for example, the contact between the cartridge forward surface 82 and the body tapered surface 94 to effect pull-up by torque also produces a radial support of the body for the cartridge after pull-up. This feature of these embodiments when used further facilitates the use of the fitting at higher pressures along with the pull-up by torque functionality.

Other embodiments may be used to effect pull-up by torque rather than having the cartridge 76 engage the body 12. For example, a ferrule can be designed to engage the body in a manner to effect pull-up by torque, as described below with regard to FIGS. 19-20. In addition, any two generally radial surfaces of the nut 16 and the body 12 can be designed to engage upon proper pull-up of the fitting 10 to provide the sharp torque increase. For example, an exterior surface on the fitting body may be designed to engage an exterior surface of the nut upon complete pull-up. These surfaces, as with the camming surface 94 and cartridge tapered surface 82, may be angled to allow for remake of the fitting.

A fitting in accordance with the invention may be used in pressure applications below 12 ksi, even 8 ksi, but more notably may be used as a higher pressure rated fitting above 8 ksi, even above 12 ksi. A number of features and aspects of the invention relate to the ability of the fitting to withstand higher rated pressures, as will now be discussed.

Unlike traditional female style fittings, the invention provides a fitting 10 in which the ferrules 20, 22, and especially the front ferrule 20, are radially constrained against pressure by the male fitting component rather than the female fitting component. In other words, the front ferrule 20 engages with the camming surface 92 in a manner similar to prior female fitting designs, but is radially constrained and held against pressure by the cartridge 76.

For fittings that are made of stainless steel, the nut 16 can be a work hardened part, such as can be machined from bar stock, for example, because it must be strong enough to constrain the ferrules 20, 22 under higher pressures. The female body 12, however, does not need to be a formed from work hardened material because it is not necessarily utilized to protect the ferrules 20, 22 under pressure. Therefore, the body 12 may be formed from an annealed material, such as by forging or casting, for example. Forming the fitting body 12 by forging or casting, for example austenite stainless steel, can be significantly less expensive than forming it by machining from hardened bar stock. This is especially true if the fitting body is (or is part of) a complex shape, such as a tee or an elbow. As a result, significant cost savings can be realized with the present invention. Further, austenite stainless steel, which cannot be hardened by heat treating, can be utilized to form the body without needing to work harden the steel. Forming the body from austenite stainless steel is advantageous in many applications due to its excellent corrosion resistance.

The ability to provide a fitting 10 that can function at higher pressure rating or working pressures with an annealed body also greatly expands its available applications. For example, the fitting body 12 can be formed by providing a female port in a variety of fluid components that are made of softer annealed metals, such as pump housings, cylinder heads, manifolds, tanks, and so on. Still a further alternative embodiment, however, provides that the body 12 may also be formed from work hardened material or have a portion of the body work hardened, if so required, particularly for even higher pressure ratings or working pressures.

Selectively work hardening a portion of the fitting body 12 makes the fitting withstand high internal pressures without deformation or damage that would cause leakage of the fitting 10. Thus, selectively work hardening the fitting body provides a similar advantage to not utilizing the body to protect the tube gripping device 20, 22 under pressure. Specifically, the body 12 may be formed from an annealed material, rather than hardened bar stock. Doing so results in a fitting 10 that can function at higher pressure rating or working pressures but be realized at a significant cost savings over prior high pressure fittings.

If, for example, the fitting 10 is to be rated at 15 ksi, then it is, by industry convention, tested typically under hydraulic pressure up to and exceeding four times that pressure rating (a 4-to-1 tube grip performance factor), or 60 ksi. A statistically significant number of fittings are tested up to and exceeding 60 ksi to reliably predict with high confidence that the fitting will go to at least four times the prospective working pressure without leakage. Applicants have found that the fitting 10 in accordance with the present invention can hold pressures up to about 75 ksi and greater, thus providing at least a 5-to-1 tube grip performance factor. Thus, selectively work hardening a portion of the fitting 10 also allows the use of a relatively soft forging for the fitting body 20.

As described hereinabove, the fitting 10 may be selectively work hardened by plastically deforming a portion 81 of the fitting. A portion of the fitting 10, radially outward of the ferrules 20, 22, is work hardened by rolling a set of circumferential ribs or an external male thread 98 on the fitting body 12. The work hardening can be performed concurrently with the machining of the fitting body 12 or other part. Specifically, a piece, such as the fitting body 12, is typically machined on a multiple spindle machine having multiple index positions at which various machining operations are done sequentially. With one of these operations being the rolling of the ribs or thread 98, to work harden the fitting body 12, the body need not be subjected to a separate work operation (off the one machine) to harden it. The part 12 can be loaded once onto the machine, machined including the work hardening to form the thread 98, then unloaded.

In addition, the male thread 98 that may be formed in the work hardening process can provide a more useful configuration to the fitting 10. In particular, the thread 98 can be used to attach certain fitting enhancements to the fitting 12. For example, one or more lock nuts can be threaded onto the male thread 98 to further strengthen the fitting 10. Additional examples can include using the thread 98 to mount the fitting body 12 to a panel or to attach a means that can support the tube T, assist retaining the tube in the fitting 10, assist attenuating the effects of outside tube vibration, or other functions.

The higher pressure rating, 15 ksi or higher, may be further achieved with the fitting 10 disclosed herein because of the ability to case harden or carburize the ferrules. This allows the ferrules 20, 22 to bite and seal against work hardened conduits such as for example heavy walled tubing or ⅛ hard or strain hardened material that is needed for higher pressure applications. The fitting 10 provides a back ferrule 22 that has substantial bulk material to make the ferrule stronger in gripping the conduit as well as being able to bite into the conduit. Still further, the seal formed by the cartridge 76 against the second camming surface 94 provides a secondary or backup seal to the body seal formed by the front ferrule 20 against the first camming surface 92. The cartridge seal against the second camming surface 94 may be facilitated by use of the softer annealed body.

The invention, however, is not limited to use with stainless steel materials. For example, the automotive industry, especially for alternative fuel vehicles, may decide to pursue carbon steel rather than stainless steel for various fittings and conduits. The invention provides advantages in the use of carbon steel as well, even though carbon steel can be hardened by annealing. These advantages include but are not limited to the cartridge concept for easier assembly (to be described further hereinbelow), providing a seal with the cartridge against the body, and providing a fitting that can be pulled up to torque rather than by turns.

Figure 10:
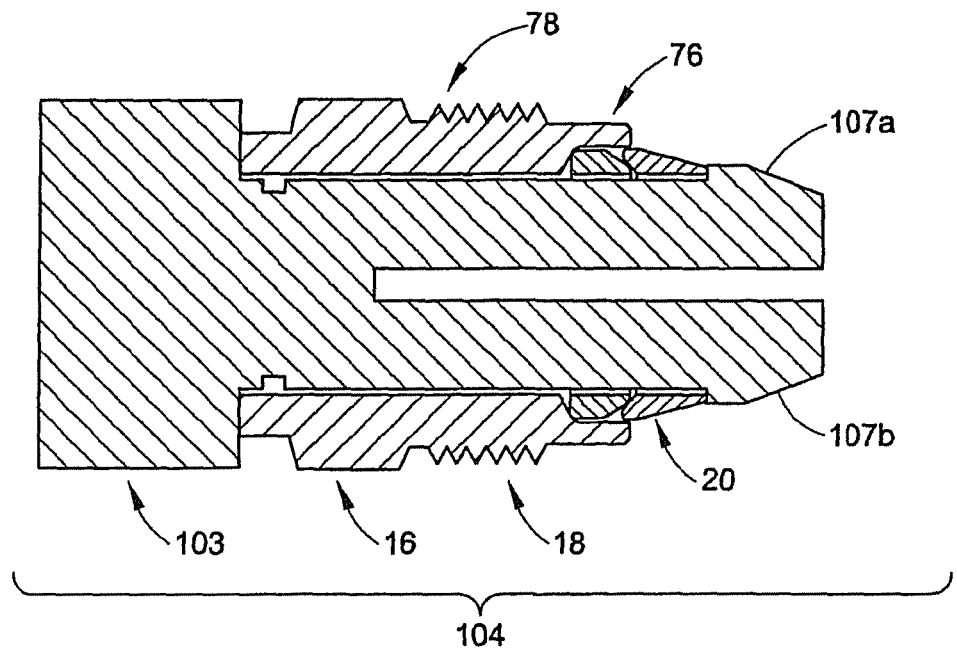
FIG. 10 is a longitudinal cross section of the nut and two ferrules of the exemplary fitting shown in FIG. 1 where nut and two ferrules are installed on a tool.

FIG. 10 is a longitudinal cross section of the nut 16 and two ferrules 20, 22 of the exemplary fitting shown in FIG. 1 where nut and two ferrules are installed on a tool 103. The tool 103 provides a convenient way to hold the cartridge nut 16 and one or more ferrules 20, 22 together as a single assembly 78 prior to make-up of a fitting 10. Thus, the assembly 78 and tool 103 together provide a single unit 104 that can be installed in a mating fitting component, such as for example the female fitting component 12, so that an assembler only needs to handle two fitting parts. As a result, there are no loose ferrules to assemble, and the ferrules can be installed at the manufacturer to avoid installation errors. Other techniques for providing a cartridge nut assembly such as the use of an adhesive have been described hereinabove.

Figure 11:
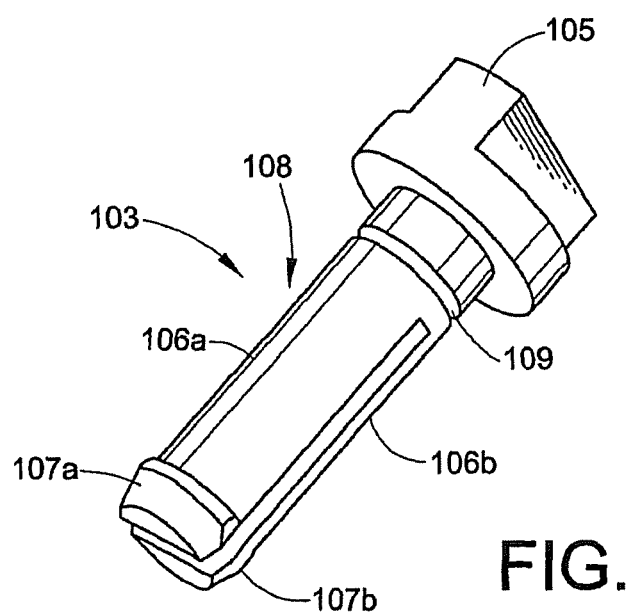
FIG. 11 is a perspective view of the tool shown in FIG. 10.

FIG. 11 illustrates a perspective of an exemplary embodiment of the tool 103. With reference to FIGS. 10 and 11, the tool 103 includes a head 105 that can be manually gripped or can be gripped by a simple tool such as pliers. The tool 103 is a single plastic element but other materials may be used as required. Flexible fingers 106a and 106b extend from the head 105 and include at their respective distal end, a raised lip 107a and 107b. The lips 107a,b and head 105 define a slot or carriage 108 onto which the cartridge nut 16 and the ferrules 20, 22 can be installed. The flexible fingers 106a,b radially compress enough to allow the nut 16 and then the ferrules 20, 22 to move over the lips 107a,b toward the head 105. Once past the lips 107a,b, the fingers 106a,b snap back outward, thus retaining the ferrules 20, 22 and nut 16 together on the tool 103 as a single assembly 78.

Figure 12A:
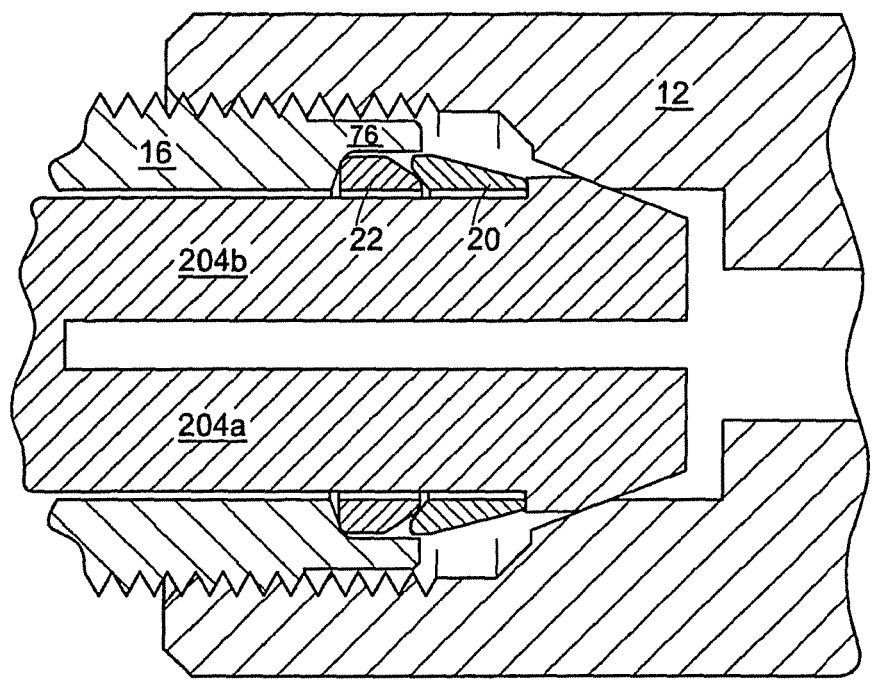
FIGS. 12A-B are side cross-sectional views of the exemplary fitting shown in FIG. 1 illustrating various steps in the use of the tool for making-up the fitting.
Figure 12B:
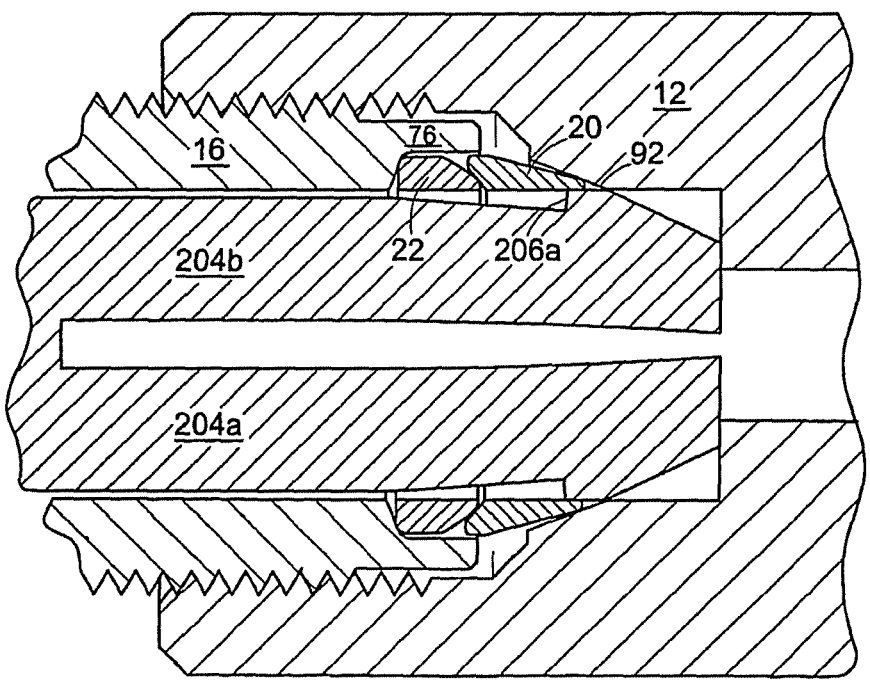
Figure 13:
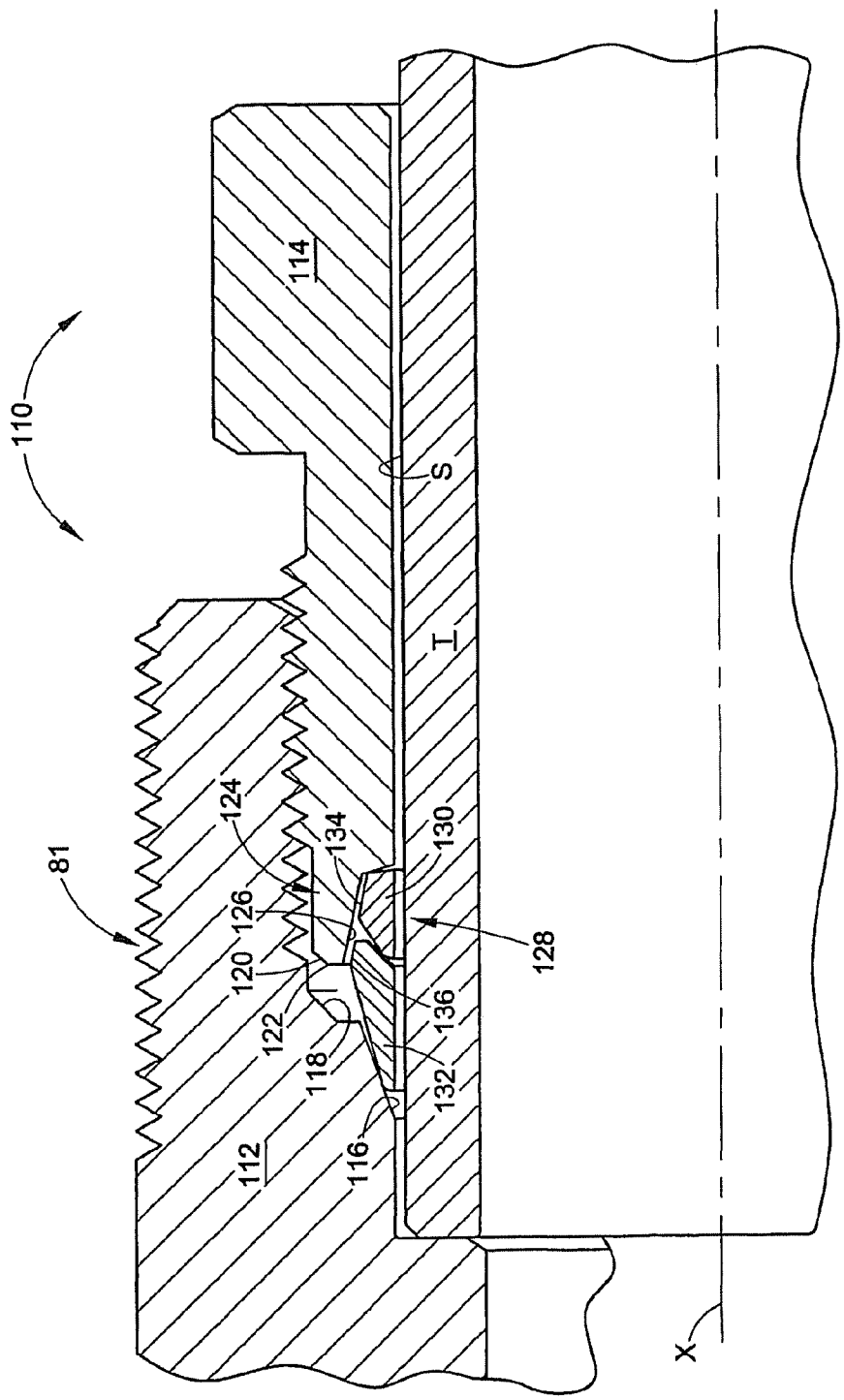
FIG. 13 is a longitudinal cross-section of another exemplary fitting of the present invention shown in a finger tight condition.

FIGS. 12A and 12B illustrate various steps in the use of the tool 103 to make up the fitting 10. To make up the fitting 10, the assembly 78 is inserted into the female body 12 and the assembler can easily use finger pressure to rotate and threadably engage the nut 16 and the body 12 (or rotate the nut into a female port in another body). As the nut 16 is threaded into the body 12, the lips 107a,b will engage a surface inside the body 12, in this case the first camming surface 92. Further axial displacement of the assembly 78 and tool 103 into the body 12 causes the fingers 106a,b to be radially compressed due to a camming action against the body 12.

The continued axial displacement of the assembly 78 and tool 103 causes the fingers 106a,b to compress sufficiently for the lips 107a,b to be dimensionally smaller than the inside diameter of the ferrules 20, 22 and the nut 16. The tool 103 thus self disengages from the ferrules. When this occurs, the tool 103 can be easily extracted from the assembly 78 and body 12. Note that the tool 103 can be easily adapted to any size fitting, and also can be color coded or provided with other indicia to indicate information about the assembly 78, such as the size, materials, pull-up torque and so on. For example, a groove 109 or other suitable marking, indicia or structure may be provided on the tool 103 to provide a visual indication to the user that the fitting has been adequately made up in the finger tight position to allow easy removal of the tool.

FIGS. 13-18 illustrate another exemplary fitting of the present invention. Many of the functional features of this embodiment are similar to the above embodiment except as otherwise noted. The exemplary fitting 110 of FIGS. 13-18 includes a female threaded body 112 and a male threaded nut 114. The body 112 includes a first camming surface 116 and a second camming surface 118. The second camming surface 118 engages with an angled surface 120 on the interior end 122 of a cartridge 124 formed as part of the nut 114 during pull-up (FIG. 14). The angle θ of the surface 120 may be about forty-five degrees relative to the central longitudinal axis X of the fitting 110, but other angles may be used as required. In this embodiment, however, the cartridge 124 includes a tapered or conical wall 126 that forms a tapered socket 128 for a back ferrule 130 and at least a portion of a front ferrule 132. The tapered socket 128 provides for easier withdrawal of the nut 114 during disassembly because the ferrules can disengage from contact with the wall 126 during withdrawal of the nut. The wall 126 may taper at an angle ε of about five to about twenty degrees relative to a central longitudinal axis X but other angles may be used as required. The back ferrule 130 may include a tapered outer wall portion 134 to facilitate disassembly, and the front ferrule 132 may also include a tapered outer wall portion 136. The back and front ferrule tapered outer walls 134, 136 may be formed at an angle suitable to achieve the desired effect, for example, about five to about twenty degrees relative to the axis X, but other angles may be used as needed. Thus, the invention contemplates a cartridge design in which upon disassembly the entire assembly of the nut 114 and two ferrules 130, 132 can be withdrawn or where the nut can be separately removed. The inclusion of a tapered socket may be especially useful for higher pressure applications because the ferrules will not bind or "weld" to the socket wall upon pull-up or application of high pressure. The ferrules will disengage from the tapered socket wall as the nut is withdrawn so that torque will not be applied to the ferrules during disassembly. This will help assure that a proper remake of the fitting can be effected.

Figure 19:
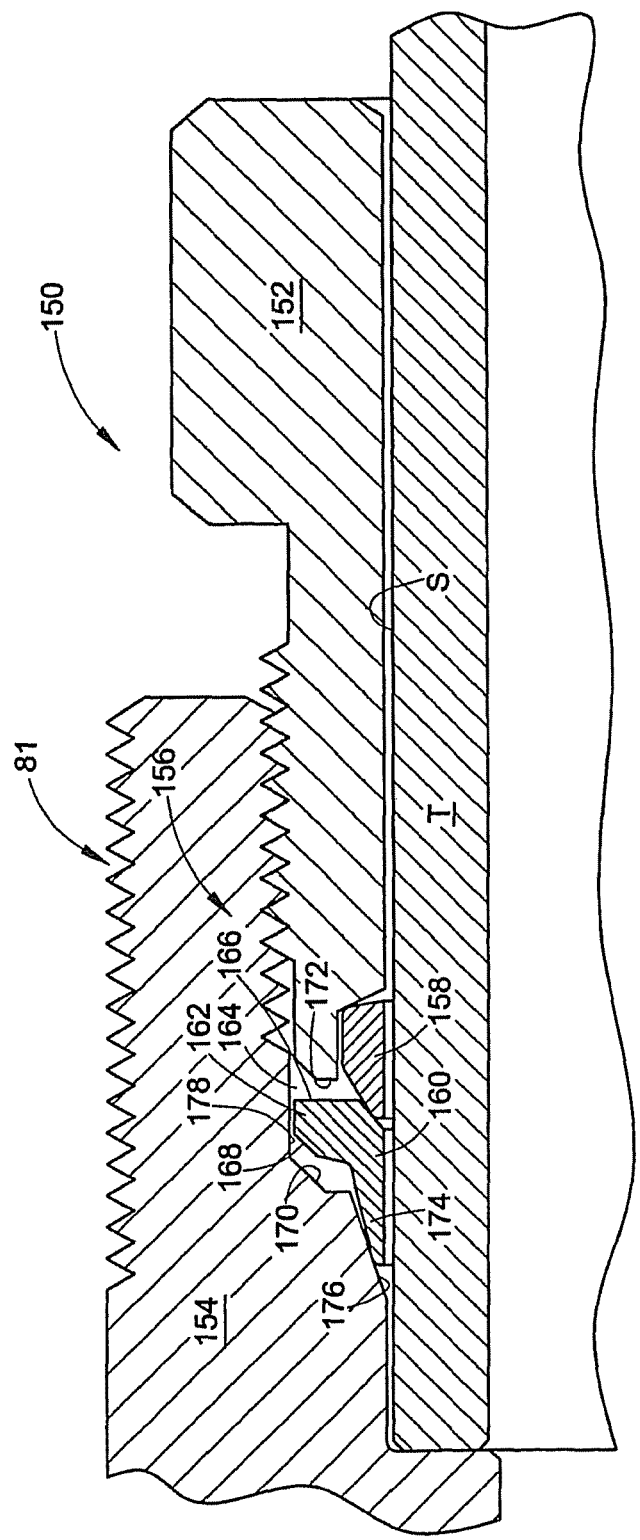
FIG. 19 is a longitudinal cross-section of another exemplary fitting of the present invention shown in a finger tight condition.
Figure 20:
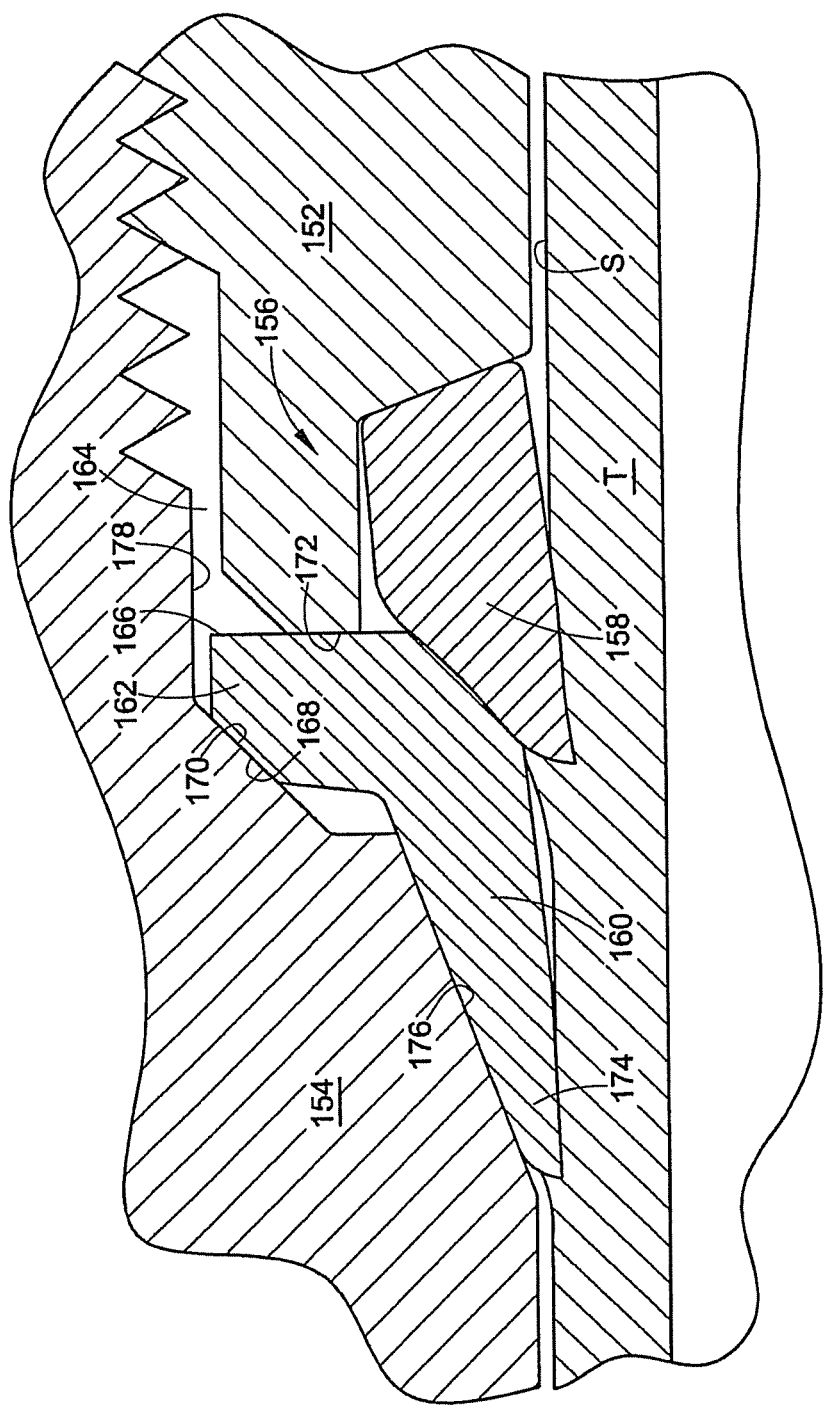
FIG. 20 is a half longitudinal cross-section of the exemplary fitting shown in FIG. 19 in a pulled-up condition, enlarged in the area of the ferrule.

FIGS. 19 and 20 illustrate another embodiment of the present invention wherein FIG. 19 is a longitudinal cross-section of a fitting in a finger tight position and FIG. 20 illustrates the fitting in the pulled-up position. In this embodiment the fitting 150 includes a nut 152 and body 154 that may be similar in design to the embodiments described herein above. In this embodiment, however, the axial length 155 of the cartridge 156 is shortened because the cartridge 156 is only being used to retain the back ferrule 158. The front ferrule 160 is no longer contained within the cartridge 156. A tool, similar to the tool shown in FIGS. 10-12, may be used to maintain a single component assembly as in the above described embodiments.

In this example, the front ferrule 160 includes an enlarged radially extending flange 162. The flange 162 is sized to fit within a bore 164 of the fitting body 154. The flange 162 further includes a driven rear surface 166 and a seal surface 168 at a forward portion 169 of the flange. The seal surface 168 extends at an angle θ, such as about forty-five degrees, for example. The seal surface 168 engages a first camming surface 170 of the body 154 during pull-up. This provides a dependable secondary pressure seal and pull-up to torque design similar in function to the engagement of the front end of the cartridge of the above embodiments.

The driven surface 166 in this example is generally radial and engages the front end 172 of the cartridge 156 during pull-up so that the cartridge directly drives the front ferrule 160 forward. The back ferrule 158 also drives the front ferrule 160 forward until the cartridge 156 engages the front ferrule flange 162. The front ferrule 160 further includes a tapered nose portion 174 that engages a second camming surface 176 of the body 154. The flange 162 may be appropriately dimensioned so that the flange is supported by the body wall 178, particularly under pressure. The body 154, thus, may be formed of work hardened raw material, or may have work hardening selectively applied to an annealed body.

FIG. 21 is a half longitudinal cross-section of another exemplary fitting of the present invention shown in the finger tight condition. In this embodiment, the fitting 180 includes a body 182 and ferrules 184, 186 that may be similar in design to the embodiments described hereinabove. In this embodiment, however, fitting 180 includes a different nut 188. The nut 188 has a generally cylindrical configuration that defines a passage 190 for receiving a tube end T. The nut 188 has an external thread 192 for engagement with the internal thread 194 of a female fitting component, such as the fitting body 182, for example. The nut 188 has a rear face or outer face 196 that includes a key hole 198. The key hole 198 is adapted to receive a key tab 200 of a keyed wrench 202.

Figure 22A:
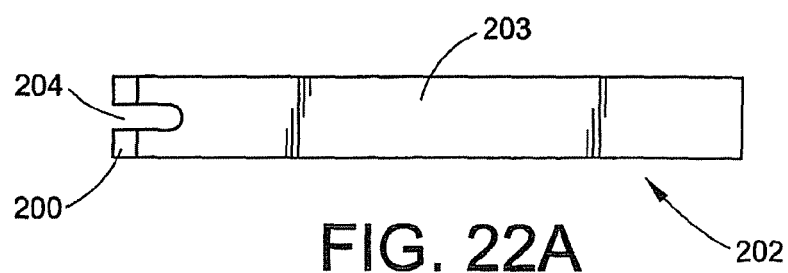
FIGS. 22A and 22B are plan and elevation views of a key tool for use with the exemplary fitting shown in FIG. 21.
Figure 22B:

With reference to FIG. 22, the keyed wrench 202 has an elongated handle portion 203 with a generally rectangular cross-section. The cross-sectional shape of the handle portion 203 can be other than rectangular. For example, the handle portion 203 could have an oval or circular cross section. The key tab 200 extends from the handle portion 203 at about a right angle. The key tab 200 may extend from the handle portion 203 at an angle other than a right angle, though a right angle is preferred. The key tab 200 is adapted to mate with the key hole 198 to allow the key wrench 202 to rotate the nut 188 sufficiently to pull-o the fitting 180.

The key wrench 202 also includes a clearance opening 204 extending along a central axis 206 of the handle portion 203. The clearance opening 204 is sized and positioned to allow the key wrench 202 to straddle the conduit and engage the nut 188 without the tube interfering.

The length of the nut 188 is selected so that, when the nut is fully screwed into the fitting body 182, the rear face 196 of the nut 96 is flush with the end of the body 182, or is recessed. There is no standard hex configuration projecting from the fitting body 182. As a result, the chance of inadvertent loosening or removal of the nut 188 is reduced since the ability to disassemble the fitting 180 is restricted to only those personnel that have the specific keyed wrench 202. In addition, providing different positions for the key hole 198 on the nut 188 may allow specific products (sizes, etc.) to be manufactured in combination with specific wrenches.

Further, because the nut 188 does not project from the fitting body 182, the assembled fitting 180 is smaller. This can be beneficial in applications in which space is at a premium, for example, automotive applications. Finally, the nut 188 is also beneficial as it may allow for cost reduction, since the complete nut can be silver plated (for lubrication of the threads 192) without the need to selectively plate the threads or to strip plating off of the hex area (as is done for standard female nuts) for cosmetic effect. Thus, silver plating can be accomplished by dipping the entire nut 188.

Figure 23:
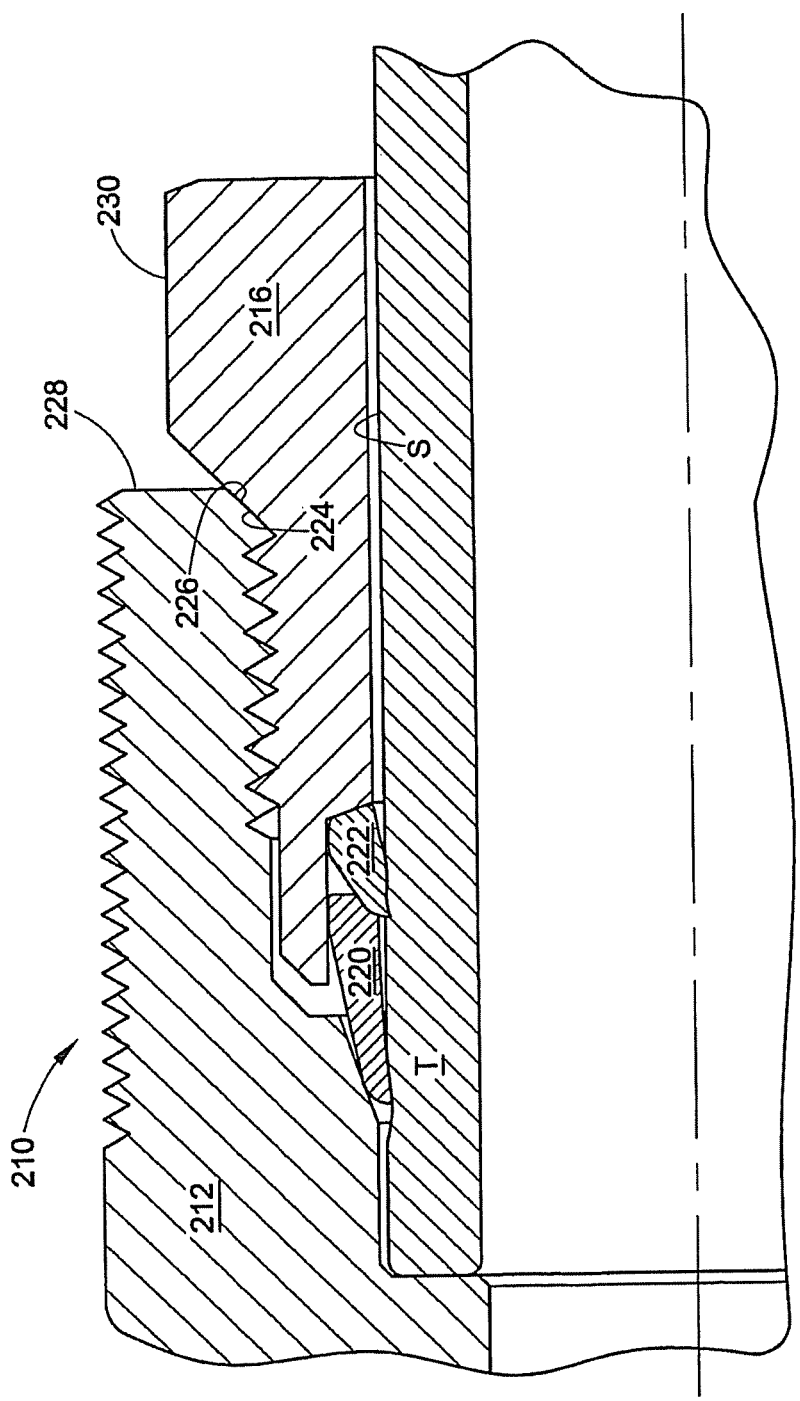
FIG. 23 is a half longitudinal cross-section of another exemplary fitting of the present invention shown in the pulled-up condition.

FIG. 23 is a half longitudinal cross-section of another exemplary fitting of the present invention shown in the pulled-up condition. In this embodiment, the fitting 210 includes a body 212, a nut 216, and ferrules 220 and 222 that may be similar in design to the embodiments described hereinabove. In this embodiment, however, body 212 includes an exterior camming surface 224 that engages a tapered surface 226 on the nut 216 upon proper pull-up. The exterior camming surface 224 may be located on a forward end 228 of the body 212. The tapered surface 226 of the nut 216, tapers outward from the axis X away from the body 212. The tapered surface 226 may be located, for example, on a tool engagement portion such as a hex portion 230.

Figure 24:
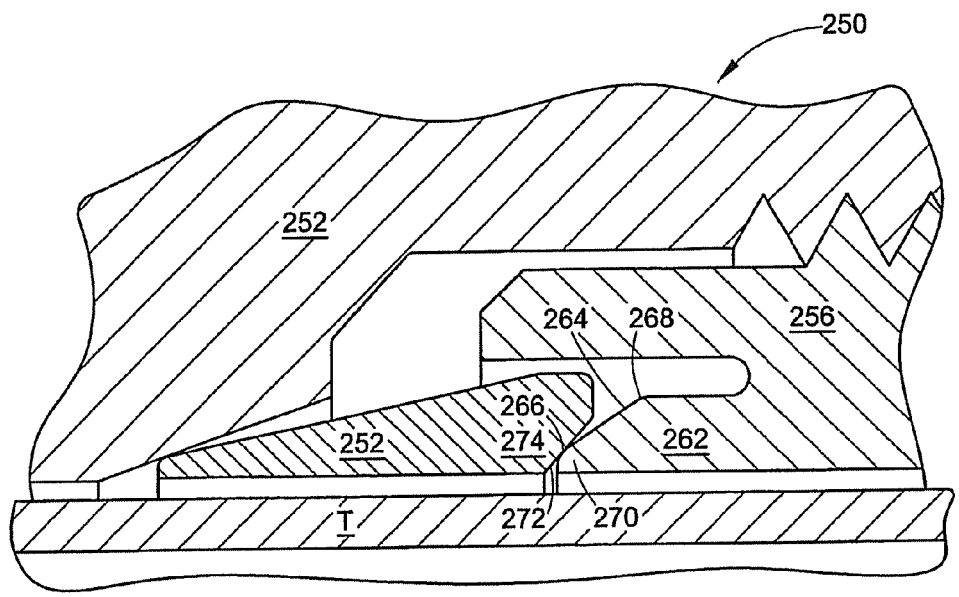
FIG. 24 is a half longitudinal cross-section of another exemplary fitting of the present invention shown in a finger tight condition, enlarged in the area of the ferrule.

FIG. 24 is a half longitudinal cross-section of another exemplary fitting of the present invention shown in the finger tight condition. In this embodiment, the fitting 250 includes a body 252, a nut 256, and a first ferrule 260 that may be similar in design to the embodiments described hereinabove. In this embodiment, however, the nut 256 includes an integral ferrule 262 that can either replace the first ferrule 260 or, as shown in FIG. 24, function as a second ferrule. The geometry of the integral ferrule 262 (such as, for example, a tapered outer surface portion 264, radius portions 266 and 268, a nose portion 270, and so on) is selected so as to effect an appropriate radially inward hinging action of the integral ferrule in response to the nose portion being driven into a camming surface, such as a camming surface 272 on a rearward portion 274 of the first ferrule 260. The concept of a integral ferrule utilized in a fitting has been disclosed in International Publication Number WO 02/063194A2, the entire disclosure of which is fully incorporated herein by reference. The publication and the concepts therein, however, are exemplary in nature as to the present invention and should not be construed in a limiting sense.

Figure 25:
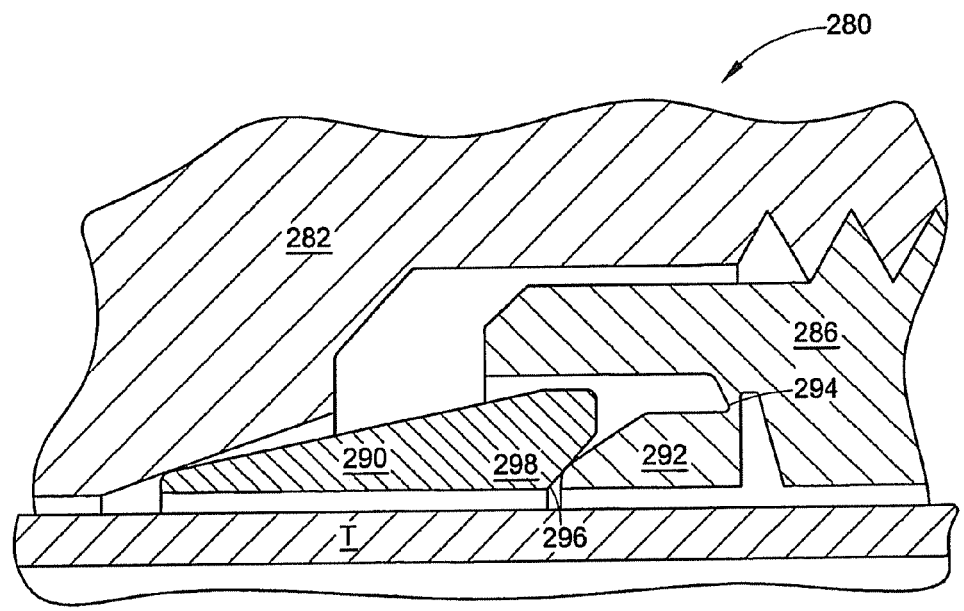
FIG. 25 is a half longitudinal cross-section of another exemplary fitting of the present invention shown in a finger tight condition, enlarged in the area of the ferrule.

FIG. 25 is a half longitudinal cross-section of another exemplary fitting of the present invention shown in the finger tight condition. In this embodiment, the fitting 280 includes a body 282, a nut 286, and a first ferrule 290 that may be similar in design to the embodiments described hereinabove. In this embodiment, however, the nut 286 includes a separable ferrule 292 that can either replace the first ferrule 290 or, as shown in FIG. 25, function as a second ferrule. The separable ferrule 292 is attached to the nut 286 by a frangible web portion 294. Upon partial pull-up of the fitting 280, the separable ferrule 292 engages a camming surface, such as a camming surface 296 on a rearward portion 298 of the first ferrule 290, and breaks off or separates from the nut 286. Once separate, the separable ferrule 292 functions similar to the ferrules described in the embodiments hereinabove. The concept of a separable ferrule utilized in a fitting has been disclosed in International Publication Number WO 02/063195A2, the entire disclosure of which is fully incorporated herein by reference. The publication and the concepts therein, however, are exemplary in nature as to the present invention and should not be construed in a limiting sense.

The invention has been described with reference to the preferred embodiments. Modification and alterations will occur to others upon a reading and understanding of this specification. It is intended to include all such modifications and alterations insofar as they come within the scope of the appended claims or the equivalents thereof.

The invention claimed is:

1. A conduit fitting, comprising:
   a first fitting component adapted to receive a conduit end along a central axis; a conduit gripping device;
   a second fitting component that can be joined to said first fitting component, said second fitting component comprising a portion that engages a tapered surface of said first fitting component when the conduit fitting is pulled up;
   said second fitting component comprising a socket that receives said conduit gripping device, said engagement providing radial constraint of said conduit gripping device,
   wherein said first fitting component comprises a first tapered surface and a second tapered surface, with a step that joins said first tapered surface and said second tapered surface, said second tapered surface comprising said tapered surface that engages said portion of said second fitting component when the conduit fitting is pulled up.

2. The conduit fitting of claim 1 wherein said second fitting component radially constrains said conduit gripping device after the conduit fitting is pulled up.

3. The conduit fitting of claim 1 wherein said conduit gripping device comprises a front ferrule and a back ferrule.

4. The conduit fitting of claim 2 wherein said socket retains said back ferrule and at least a portion of said front ferrule.

5. The conduit fitting of claim 1 wherein said engagement between said portion of said second fitting component and said first fitting component tapered surface radially constrains said second fitting component and said conduit gripping device.

6. The conduit fitting of claim 1 wherein said engagement between said portion of the second fitting component and said tapered surface of the first fitting component causes the amount of torque required to continue pulling-up the conduit fitting to sharply increase.

7. The conduit fitting of claim 1 wherein said first fitting component comprises a camming surface that engages said conduit gripping device when the conduit fitting is pulled up, and said engagement between said portion of the second fitting component and said tapered surface of the first fitting component occurs after said conduit gripping device engages said ferrule camming surface.

8. The conduit fitting of claim 1 wherein said first fitting component and said second fitting component are threadably joined together when the conduit fitting is pulled up.

9. The conduit fitting if claim 1 wherein said second fitting component comprises a socket, said socket comprising a drive surface that contacts a driven surface of said conduit gripping device when the conduit fitting is in a finger-tight position, said socket comprising a tapered surface that radially constrains said conduit gripping device when the conduit fitting is pulled up.

10. The conduit fitting of claim 1 wherein said engagement between said portion of said second fitting component and said tapered surface of said first fitting component allows the conduit fitting to be pulled up by a torque applied between said first fitting component and said second fitting component.

11. The conduit fitting of claim 10 wherein said torque causes a relative axial displacement between said first fitting component and said second fitting component past a finger tight position and that corresponds to a completed pull-up of the conduit fitting.

12. The conduit fitting of claim 1 wherein said second tapered surface and said second fitting component portion each have an axial length and are radially tapered relative to the central axis.

13. The conduit fitting of claim 1 wherein said step surface comprises a radial step.

14. The conduit fitting of claim 5 wherein said conduit gripping device comprises a front ferrule and a back ferrule.

15. The conduit fitting of claim 9 wherein said conduit gripping device comprises a front ferrule and a back ferrule.

16. A conduit fitting, comprising:
   a first fitting component adapted to receive a conduit end along a central axis;
   a conduit gripping device;
   a second fitting component that can be joined to said first fitting component, said second fitting component comprising a portion that engages a tapered surface of said first fitting component when the conduit fitting is pulled up;
   said second fitting component comprising a socket that receives said conduit gripping device, said engagement providing radial constraint of said conduit gripping device,
   wherein said first fitting component comprises a ferrule camming surface, said conduit gripping device comprises a front ferrule and a back ferrule, and said first fitting component tapered surface and said ferrule camming surface are surfaces formed on the first fitting component and are stepped from each other in a radially extending direction.

* * * * *